US012724381B2

(12) United States Patent
Kurimoto et al.

(10) Patent No.: US 12,724,381 B2
(45) Date of Patent: Sep. 1, 2026

(54) DEVELOPING DEVICE AND IMAGE FORMING APPARATUS INCLUDING THE SAME

(71) Applicant: SHARP KABUSHIKI KAISHA, Sakai City (JP)

(72) Inventors: Hideaki Kurimoto, Sakai City (JP); Satoshi Kimura, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 8 days.

(21) Appl. No.: 18/947,193

(22) Filed: Nov. 14, 2024

(65) Prior Publication Data

US 2025/0164922 A1 May 22, 2025

(30) Foreign Application Priority Data

Nov. 20, 2023 (JP) ................................. 2023-196550

(51) Int. Cl.
*G03G 15/08* (2006.01)
*G03G 21/16* (2006.01)
*G03G 21/20* (2006.01)

(52) U.S. Cl.
CPC ..... *G03G 21/1676* (2013.01); *G03G 15/0887* (2013.01); *G03G 21/206* (2013.01); *G03G 2221/163* (2013.01); *G03G 2221/1648* (2013.01)

(58) Field of Classification Search
CPC ........... G03G 15/0887; G03G 21/1676; G03G 21/206; G03G 2221/163; G03G 2221/1648
See application file for complete search history.

(56) References Cited

U.S. PATENT DOCUMENTS

| | | | | |
|---|---|---|---|---|
| 2005/0111874 A1* | 5/2005 | Kim | G03G 15/0817 399/98 |
| 2020/0103824 A1* | 4/2020 | Oshikawa | |

FOREIGN PATENT DOCUMENTS

| | | | | |
|---|---|---|---|---|
| EP | 0807865 A2 * | 11/1997 | G03G 15/0126 |
| JP | 2023-103529 A | 7/2023 | |

* cited by examiner

*Primary Examiner* — Sophia S Chen
(74) *Attorney, Agent, or Firm* — ScienBiziP, P.C.

(57) ABSTRACT

A developing device includes: a developing device body including a vent opening that releases internal pressure, and a filter member including a filter that closes the vent opening, the filter member detachably attached to the developing device body; wherein the filter member is subjected to an attaching operation and a detaching operation, relative to the developing device body, in a state where an inner surface of the filter is in a predetermined first posture with the inner surface facing upward; and wherein the filter member is held on the developing device body in a state where the inner surface of the filter is in a predetermined second posture different from the first posture.

9 Claims, 41 Drawing Sheets

DEVELOPING DEVICE AND IMAGE FORMING APPARATUS INCLUDING THE SAME

CROSS-REFERENCE TO RELATED APPLICATION

The present application claims priority from Japanese Application JP2023-196550, the content of which is hereby incorporated by reference into this application.

BACKGROUND OF THE INVENTION

1. Field of the Invention

The present disclosure relates to a developing device, as well as to an image forming apparatus including the developing device, such as a copier, a multifunction machine, a printer, or a facsimile machine.

2. Description of the Related Art

In a developing device, when internal pressure of a developer tank provided in a developing device body increases while accompanying developing operation, a developer accommodated in the developer tank may be ejected from an opening formed at the side of a developer carrier. For this reason, some developing devices include a developing device body provided with a vent opening for releasing internal pressure and a filter for closing the vent opening.

In the developing device including such a filter, the filter may become clogged with toner as the developing operation is performed. Therefore, a developing device in which the filter is replaceable has been proposed. This allows a user to periodically replace a clogged filter.

For example, a developing device has been conventionally known, which includes a filter member having a filter for closing a vent opening, in which the filter member is provided to be attachable to and detachable from a developing device body, and in which the filter member is subjected to an attaching operation and a detaching operation, relative to the developing device body, in a state where an inner surface of the filter faces downward.

However, in an image forming apparatus including such a conventional developing device, since the filter member is subjected to the detaching operation relative to the developing device body with the inner surface (i.e., toner adhering surface) of the clogged filter facing downward, the toner adhering to the inner surface of the filter may drop into an image forming apparatus or on a floor, outside the developing device, due to vibration or the like, and contaminate the periphery of the developing device, when the filter member is detached from the developing device body.

SUMMARY OF THE INVENTION

An aspect of the present disclosure is a developing device capable of preventing toner adhering to an inner surface of a filter from falling when a filter member is detached from a developing device body, and an image forming apparatus including the developing device.

According to an aspect of the present disclosure, there is provided a developing device including a developing device body having a vent opening for releasing internal pressure, and a filter member having a filter for closing the vent opening, the filter member being detachably attached to the developing device body; wherein the filter member is subjected to an attaching operation and a detaching operation, relative to the developing device body, in a state where an inner surface of the filter is in a predetermined first posture with the inner surface facing upward, and is held on the developing device body in a state where the inner surface of the filter is in a predetermined second posture different from the first posture. Further, there is provided an image forming apparatus, according to an aspect of the present disclosure, that includes the aforementioned developing device according to the aspect of the present disclosure.

According to the aspect of the present disclosure, it is possible to prevent toner adhering to the inner surface of the filter from falling when the filter member is detached from the developing device body.

DETAILED DESCRIPTION OF THE INVENTION

Embodiments according to the present disclosure will be described below with reference to the drawings. In the following description, same components are denoted by same reference signs. The names and functions of the same components are also identical. Therefore, detailed description thereof will not be repeated.

Image Forming Apparatus

Figure 1:
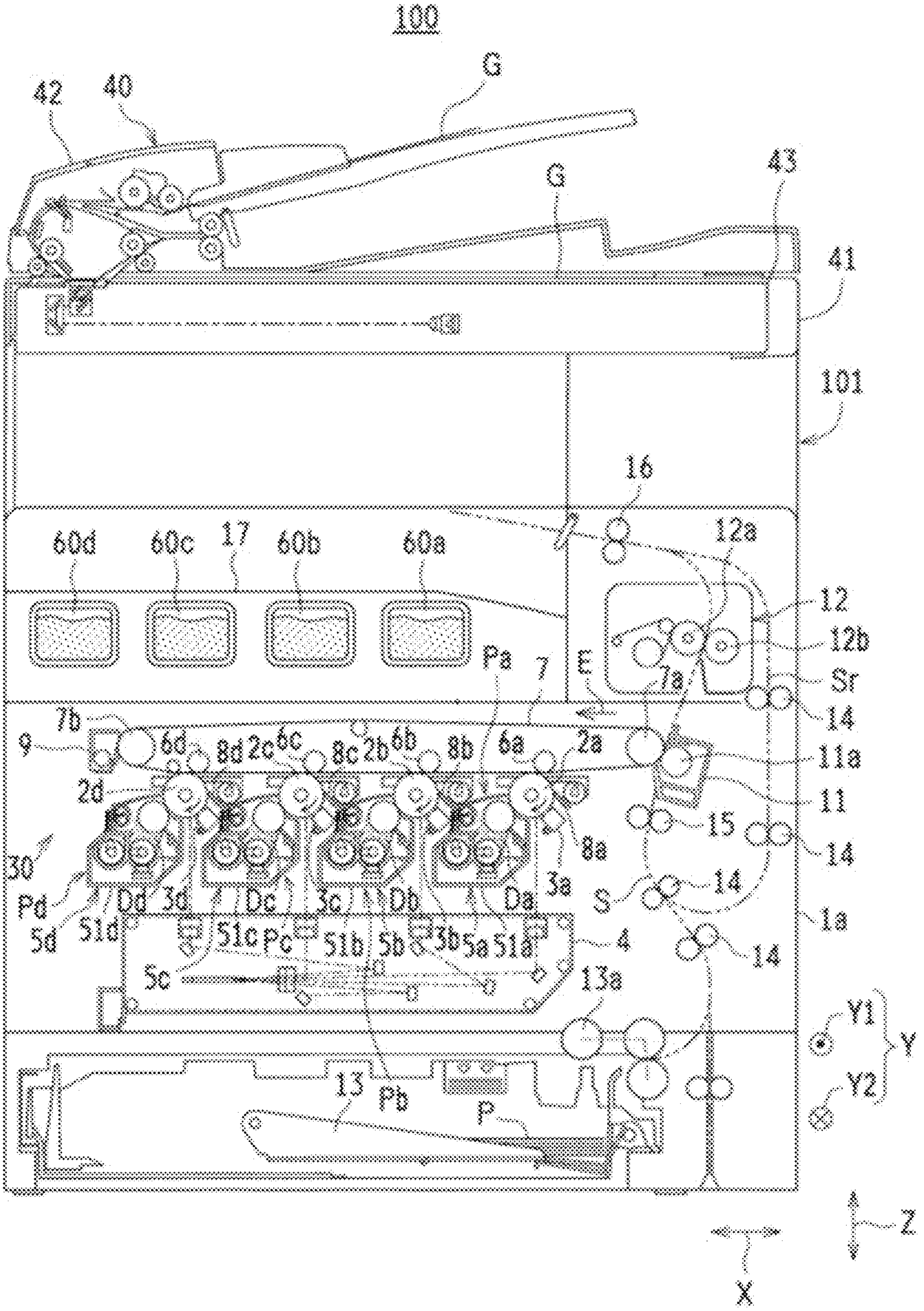
FIG. 1 is a schematic sectional view depicting an image forming apparatus that includes a developing device according to a present embodiment.

FIG. 1 is a schematic sectional view depicting an image forming apparatus 100 that includes developing devices 5*a* to 5*d* according to the present embodiment. In the drawing, sign X indicates a left-right (or lateral) direction, sign Y indicates a front-rear (or depth) direction, and sign Z indicates an up-down (or vertical) direction.

The image forming apparatus 100 is an electrophotographic image forming apparatus, and is a multifunction color machine with intermediate transfer system capable of forming full-color images. The image forming apparatus 100 is a so-called tandem-type color image forming apparatus that is provided with a plurality of electrostatic latent image carriers (specifically, photoreceptors) arranged alongside in a predetermined direction (in this example, left-right direction X). In the present embodiment, the image forming apparatus 100 is a color image forming apparatus, but may be a monochrome image forming apparatus.

The image forming apparatus 100 includes image forming equipment 30. The image forming apparatus 100 includes four image forming stations Pa to Pd, an exposure device 4, primary transfer devices 6*a* to 6*d*, an intermediate transfer belt 7 that carries a toner image, a belt cleaner 9, a secondary transfer device 11, a fixing device 12, a sheet feeder 13 (or recording material accommodation area) that accommodates a recording material P such as a recording sheet, and a body frame 1*a*.

An image forming apparatus body 101 is provided on the top area thereof with an image reading device 40. The image reading device 40 includes an image reader 41 that reads a document G conveyed by a document conveyer 42, or reads a document G placed on a document table 43. The image of the document G read by the image reading device 40 is sent to the image forming apparatus body 101 as image data, or image data from an external device is sent to the image forming apparatus body 101, and an image formed based on the image data in the image forming apparatus body 101 is recorded on the recording material P.

In the image forming equipment 30, charging devices 3*a* to 3*d*, developing devices 5*a* to 5*d*, and photoreceptor cleaning devices 8*a* to 8*d* are arranged, in this order, around photoreceptors 2*a* to 2*d* (or photoreceptor drums), respectively.

In the image forming stations Pa to Pd, toners are supplied to the developing devices 5*a* to 5*d* from toner cartridges 60*a* to 60*d* accommodating toners of respective colors of black (B), cyan (C), magenta (M) and yellow (Y), respectively. Developers Da to Dd are two component developers including toner and carrier as main components.

In an image formation process performed by the image forming apparatus 100, the surfaces of the photoreceptors 2*a* to 2*d* uniformly charged by the charging devices 3*a* to 3*d* are laser-exposed by the exposure device 4 in accordance with image data (or image information), and electrostatic latent images are formed respectively on the photoreceptors 2*a* to 2*d*. The electrostatic latent images formed on the photoreceptors 2*a* to 2*d* are developed by the developing devices 5*a* to 5*d* and thereby visualized as toner images. The toner images on the photoreceptors 2*a* to 2*d* are transferred onto the intermediate transfer belt 7 stretched around a driving roller 7*a* and a driven roller 7*b* by the primary transfer devices 6*a* to 6*d*. The toner images on the intermediate transfer belt 7 are conveyed to the secondary transfer device 11 by the intermediate transfer belt 7 rotating in a predetermined rotation direction E. On the other hand, the recording material P conveyed from a sheet feeding roller 13*a* of the sheet feeder 13 by conveyer rollers 14 arranged in a conveying path S is further conveyed toward the secondary transfer device 11 by a registration roller 15 in synchronism with the toner image on the intermediate transfer belt 7. The toner images on the intermediate transfer belt 7 are transferred by a secondary transfer roller 11*a* of the secondary transfer device 11 onto the recording material P conveyed by the registration roller 15. The toner images transferred onto the recording material P are conveyed to the fixing device 12, heated and pressurized by a fixing roller 12*a* and a pressure roller 12*b*, of the fixing device 12, and thus fused onto the recording material P. The recording material P on which the toner images are fixed is discharged outside of the image forming apparatus body 101 by a discharge roller 16 and is placed on a discharge tray 17.

If an image is to be formed not only on the front side of the recording material P but also on the back side thereof, the recording material P subjected to a fixing process is conveyed in a reverse direction to an inversion path Sr by the reverse rotation of the discharge roller 16. The recording material P conveyed by the conveying rollers 14 in the inversion path Sr is guided again toward the registration roller 15 in an inverted condition, and the toner image is formed and fixed on the back side in the same manner as the front side. Thereafter, the recording material P is discharged outside of the image forming apparatus body 101 by a discharge roller 16 and is placed on a discharge tray 17.

Developing Device

In the following description, developing devices 5*a* to 5*d*, developer tanks 51*a* to 51*d*, developers Da to Dd, and photoreceptors 2*a* to 2*d* are simply referred to as developing device 5, developer tank 51, developer D, and photoreceptor 2, respectively.

Figure 2:
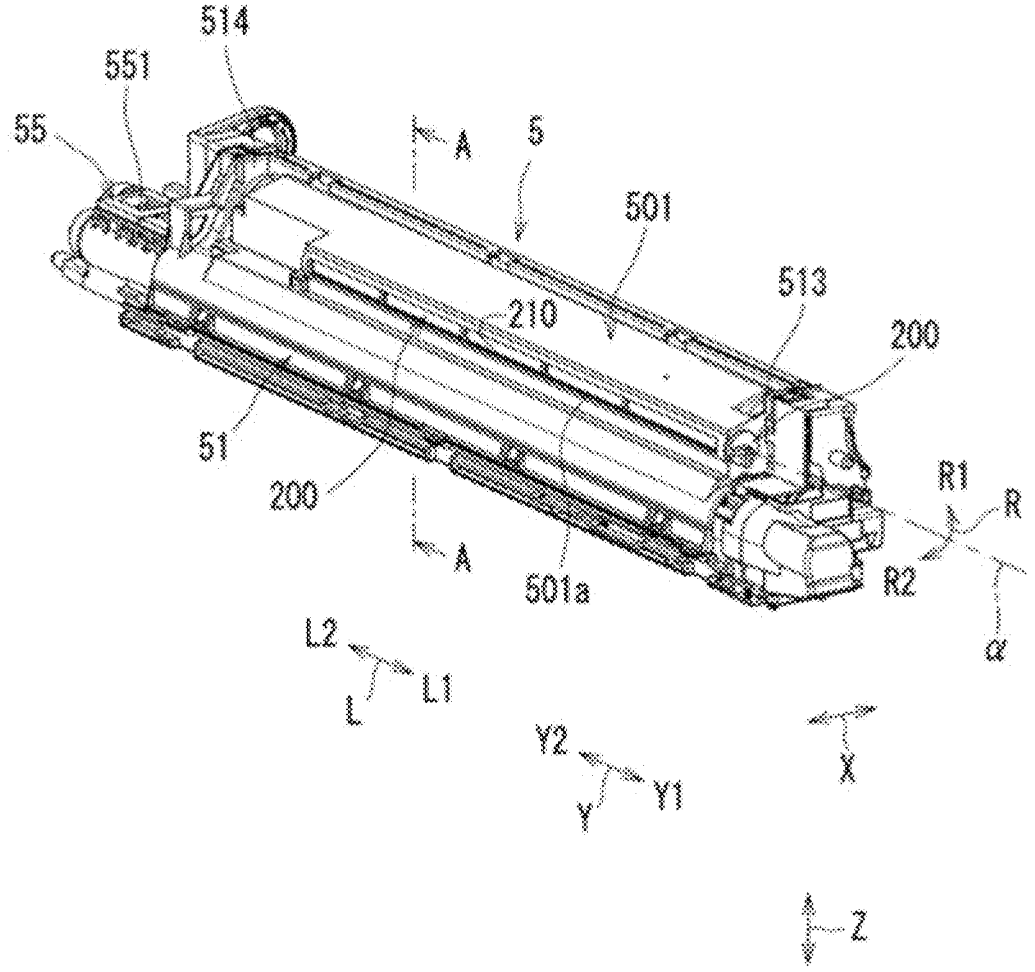
FIG. 2 is a perspective view of the developing device depicted in FIG. 1, as viewed obliquely from above on a front side.
Figure 3:
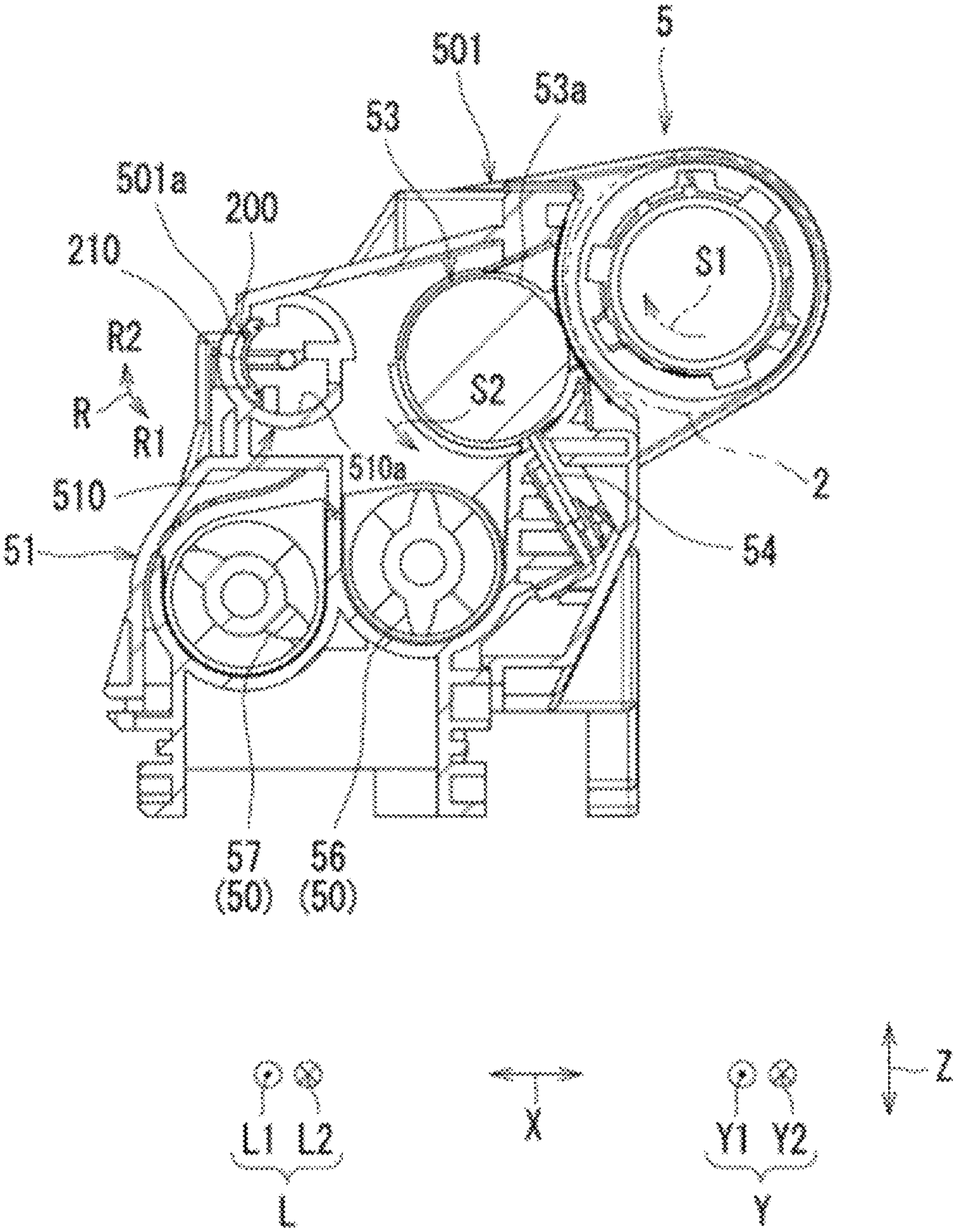
FIG. 3 is a sectional view of the developing device of FIG. 1, taken along line A-A in FIG. 2.

FIG. 2 is a perspective view of the developing device 5 depicted in FIG. 1, as viewed obliquely from above on a front side Y1. FIG. 3 is a sectional view of the developing device 5 depicted in FIG. 1, taken along line A-A in FIG. 2.

A developer tank 51 constitutes a part of a developing device body 501 that supports the constituent members of the developing device 5. The developing device 5 includes the developer tank 51 elongating in front-rear direction Y and accommodates a developer D, and a developing roller 53 (or developer carrier) elongating in front-rear direction Y and carries the developer D accommodated in the developer tank 51. The developer D accommodated in the developer tank 51 is mixed, stirred, and charged in the developer tank 51.

The developing device 5 further includes a doctor blade 54 (see FIG. 3) that regulates the layer thickness of the developer D, and a receiving portion 55 (see FIG. 2) that receives toner from a toner cartridge 60.

The developing roller 53 forms bristles (or a magnetic brush) of the developer D when a developing sleeve 53*a* rotates while causing carriers in the developer D accommodated in the developer tank 51 to be adsorbed onto the surface of the developing sleeve 53*a* by magnetic force. The doctor blade 54 is arranged in the developer tank 51 with a predetermined gap defined between the tip of the doctor blade 54 and the developing sleeve 53*a*. As a result, the doctor blade 54 can regulate the layer thickness of the developer (i.e., the height of bristles of the magnetic brush). In addition, the developing roller 53 has a configuration in which the developing sleeve 53*a* rotates in a rotation direction S2 opposite to a predetermined rotation direction S1 of the photoreceptor 2, as illustrated in FIG. 3, by a rotation driving force transmitted from a rotation drive (not depicted) to the developing sleeve 53*a*. As a result, the developing roller 53 can supply the developer D to the photoreceptor 2. The receiving portion 55 has a supply port 551 (see FIG. 2) through which the toner T is supplied to the developer tank 51.

Further, the developing device 5 is configured to circulate and convey the developer D in the developer tank 51, and includes a stirring and conveyance member 50. The stirring and conveyance member 50 includes a first stirring and conveyance member 56 (in this example, a spiral member or a first stirring and conveyance screw) and a second stirring and conveyance member 57 (in this example, a spiral member or a second stirring and conveyance screw). The first stirring and conveyance member 56 conveys the developer D toward another side L2 in the longitudinal direction L while stirring the developer D. The second stirring and conveyance member 57 conveys the developer D toward one side L1 in the longitudinal direction L while stirring the developer D. The first stirring and conveyance member 56 and the second stirring and conveyance member 57 are rotatably supported respectively on opposite lateral walls 513, 514 arranged on opposite sides in the longitudinal direction L of the developer tank 51. The developer tank 51 circulates the developer D when the first stirring and conveyance member 56 conveys the developer D toward the other side L2 in the longitudinal direction L and the second stirring and conveyance member 57 conveys the developer D to the one side L1 in the longitudinal direction L.

In the developing device 5 described above, internal pressure of the developer tank 51 in the developing device body 501 may increase while accompanying developing operation. In this respect, the developing device 5 is configured as follows.

Regarding Present Embodiment

Figure 4A:
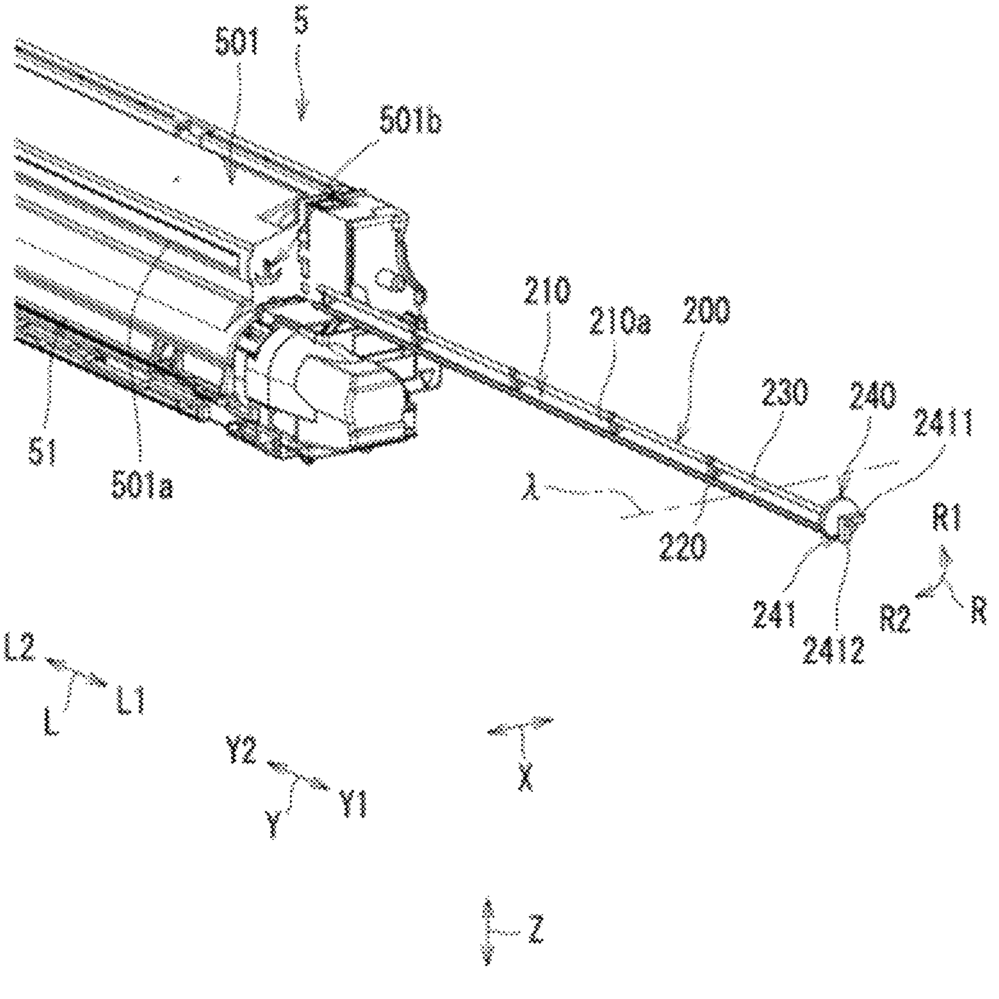
FIG. 4A is a perspective view of the developing device of FIG. 1, that depicts a state after a filter member is detached from a developing device body or before a filter member is attached to a developing device body.
Figure 4B:
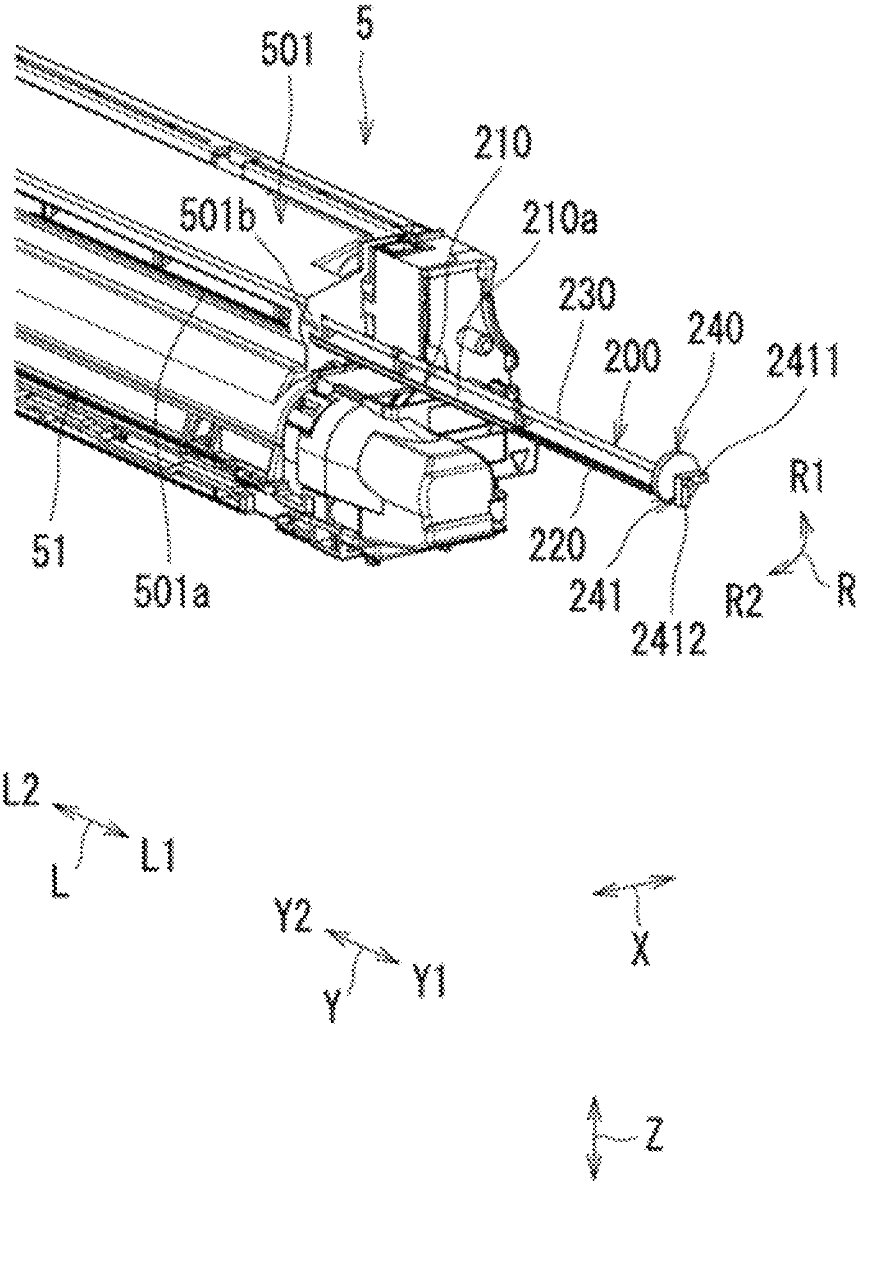
FIG. 4B is a perspective view of the developing device of FIG. 1, that depicts a state while a filter member is being attached to or detached from a developing device body.

FIG. 4A is a perspective view of the developing device 5 of FIG. 1, that depicts a state after a filter member 200 is detached from the developing device body 501 or before a filter member 200 is attached to the developing device body 501, and FIG. 4B is a perspective view of the developing device of FIG. 1, that depicts a state while a filter member 200 is being attached to or detached from the developing device body 501.

The developing device 5 according to the present embodiment includes a developing device body 501 provided with a vent opening 501*a* for releasing internal pressure of the developer tank 51, and a filter member 200 provided with a filter 210 for closing the vent opening 501*a*. The filter member 200 is provided so as to be attachable to and detachable from the developing device body 501. The filter member 200 is subjected to an attaching operation and a detaching operation, relative to the developing device body 501, in a state where an inner surface 210*a* of the filter 210 is set by a user in a predetermined first posture (see FIGS. 4A and 4B) with the inner surface 210*a* facing upward (i.e., a state located at a first position), and the filter member 200 is held with respect to the developing device body 501 in a state where the inner surface 210*a* of the filter 210 is set in a predetermined second posture (see FIG. 2) different from the first posture (i.e., a state located at a second position).

In this respect, the "first posture in which the inner surface 210*a* of the filter 210 faces upward" intends not only a posture in which the inner surface 210*a* of the filter 210 is placed horizontal (if the filter 210 is curved or arc-shaped, for example, a virtual straight line λ passing through opposite ends thereof as seen in a curving or circumferential direction is horizontal), but also a posture in which the inner surface 210*a* of the filter 210 is placed at less than plus or minus 90 degrees, preferably less than plus or minus 60 degrees, more preferably less than plus or minus 45 degrees, and still more preferably less than plus or minus 30 degrees, with reference to the posture in which the inner surface 210*a* (or virtual straight line 2) is horizontal. Note that "plus" means a rotation angle rotating closer to the vent opening 501*a*, and "minus" means a rotation angle rotating away from the vent opening 501*a*.

In the present embodiment, the filter member 200 is subjected to the detaching operation relative to the developing device body 501 in a state where the inner surface 210*a* (i.e., toner adhesion surface) of the clogged filter 210 is in the first posture (see FIGS. 4A and 4B) with the inner surface facing upward. Thus, when the filter member 200 is detached from the developing device body 501, it is possible to suppress the toner adhering to the inner surface 210*a* of the filter 210 from falling into the image forming apparatus 100 or on the floor, outside the developing device 5, due to vibration or the like, and therefore, it is possible to effectively prevent the periphery of the developing device 5 from being contaminated.

Further, in the present embodiment, the filter member 200 is held with respect to the developing device body 501 in a state where the inner surface 210*a* of the filter 210 is in the second posture (see FIGS. 2 and 3) different from the first posture. Thus, the vent opening 501*a* for releasing the internal pressure of the developer tank 51 can be provided at a location in the developing device body 501 suitable for ventilation. Any filter may be used as the filter 210, as long as it is able to ensure air ventilation and to prevent toner from being discharged, and for example, a conventionally known filter such as a nonwoven fabric can be used.

The configurations of the filter member 200 and the developing device body 501 will be described below in more detail.

Figure 5A:
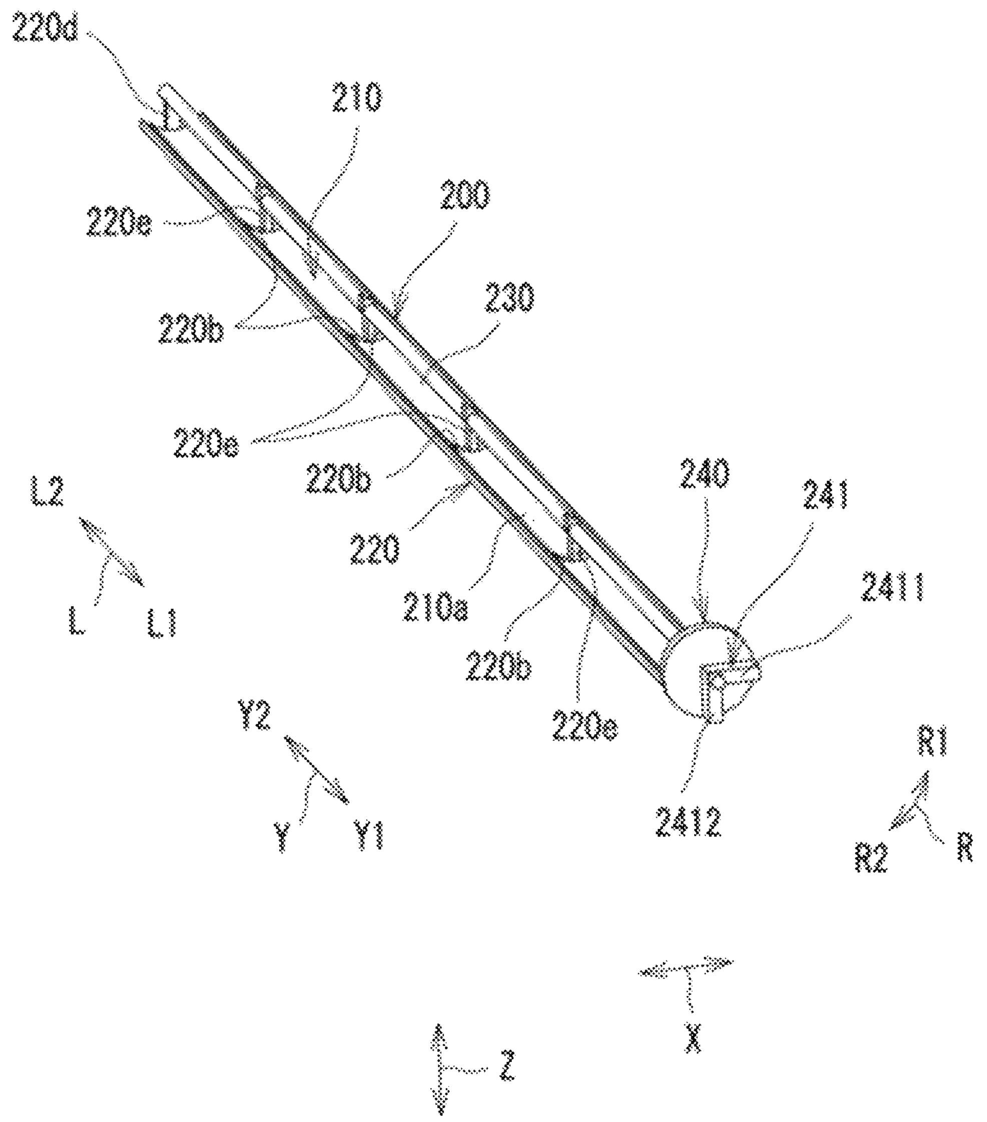
FIG. 5A is a perspective view of a filter member in a first posture, as viewed obliquely from above on a front side.
Figure 5B:
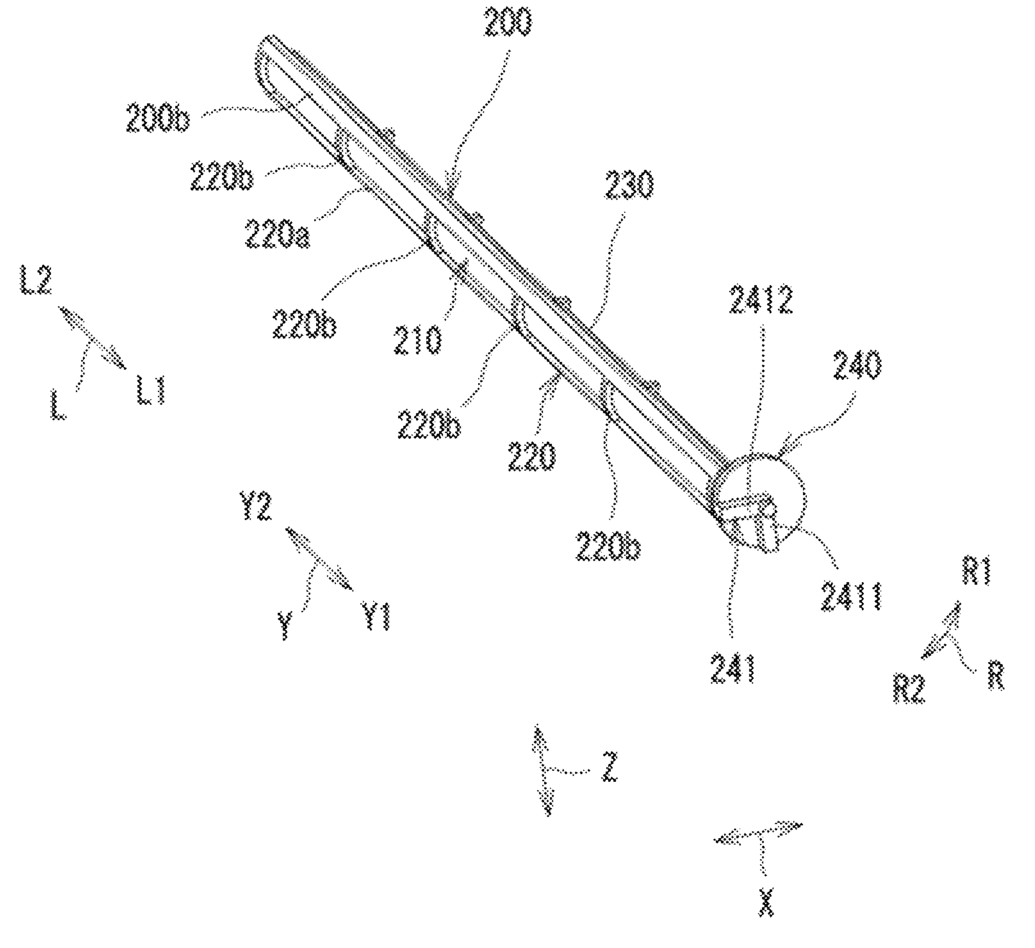
FIG. 5B is a perspective view of a filter member in a second posture, as viewed obliquely from above on a front side.
Figure 6A:
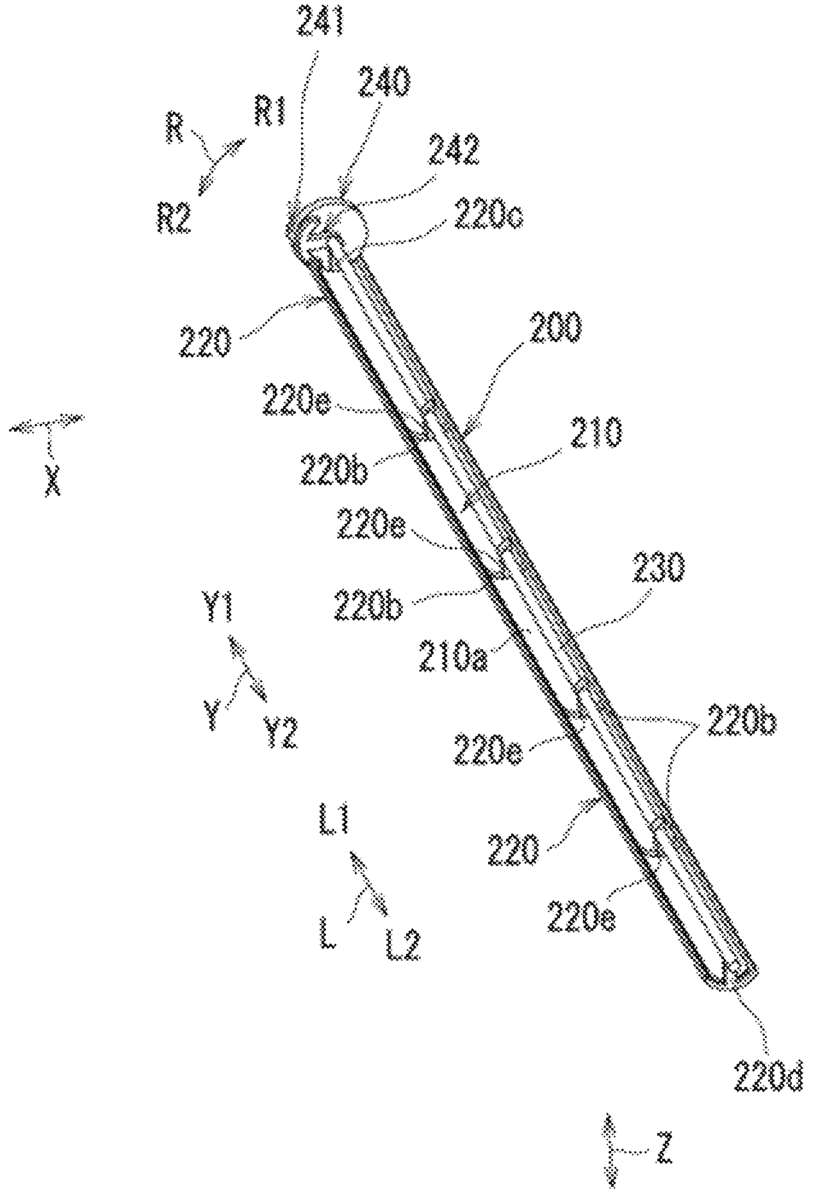
FIG. 6A is a perspective view of a filter member in a first posture, as viewed obliquely from above on a rear side.
Figure 6B:
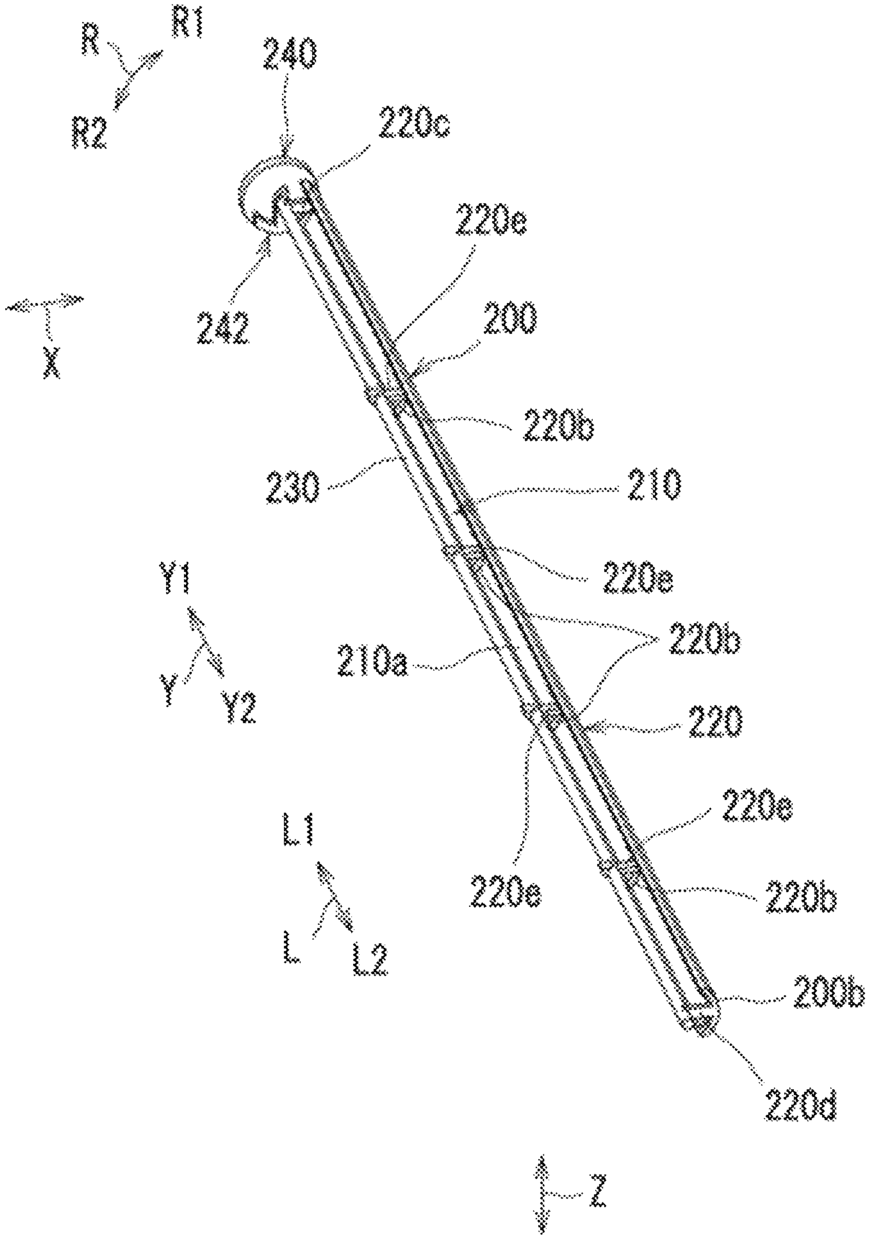
FIG. 6B is a perspective view of a filter member in a second posture, as viewed obliquely from above on a rear side.

FIG. 5A and FIG. 5B are perspective views of the filter member 200 in the first posture and the second posture, respectively, as viewed obliquely from above on a front side Y1. FIG. 6A and FIG. 6B are perspective views of the filter member 200 in the first posture and the second posture, respectively, as viewed obliquely from above on a rear side Y2.

Figure 7A:
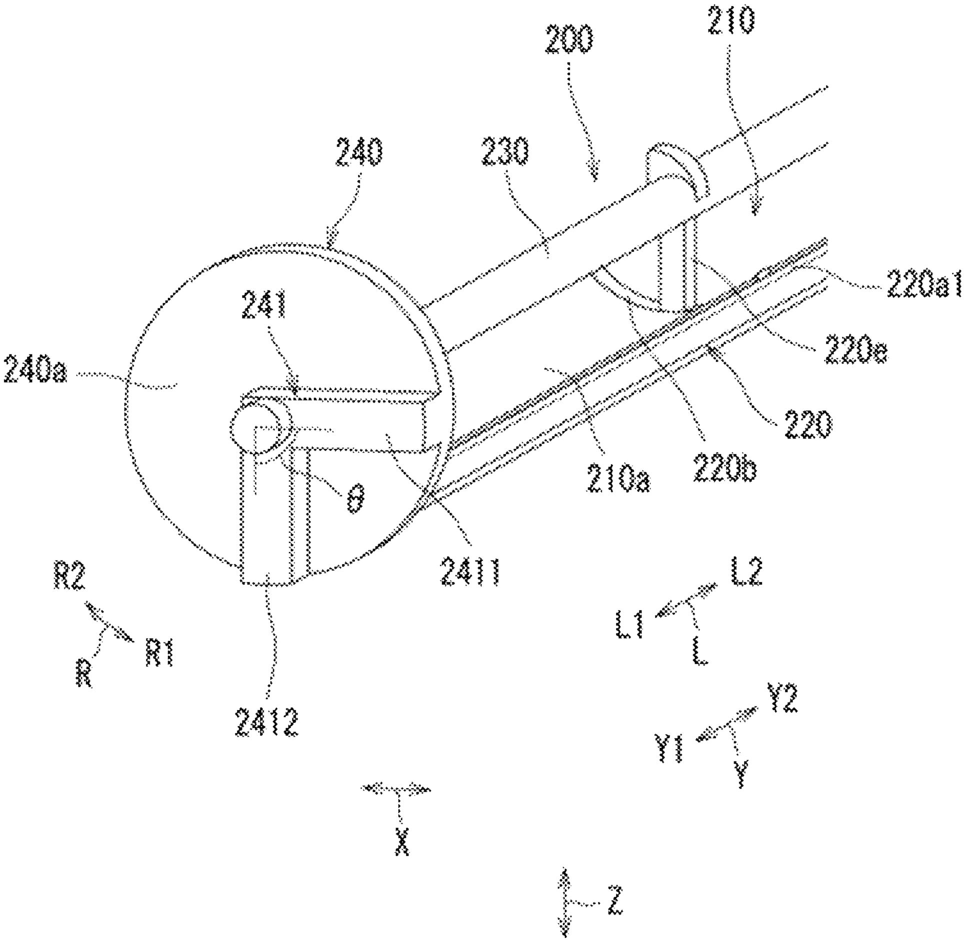
FIG. 7A is a perspective view of a front portion of a filter member, as viewed obliquely from above on a front side.
Figure 7B:
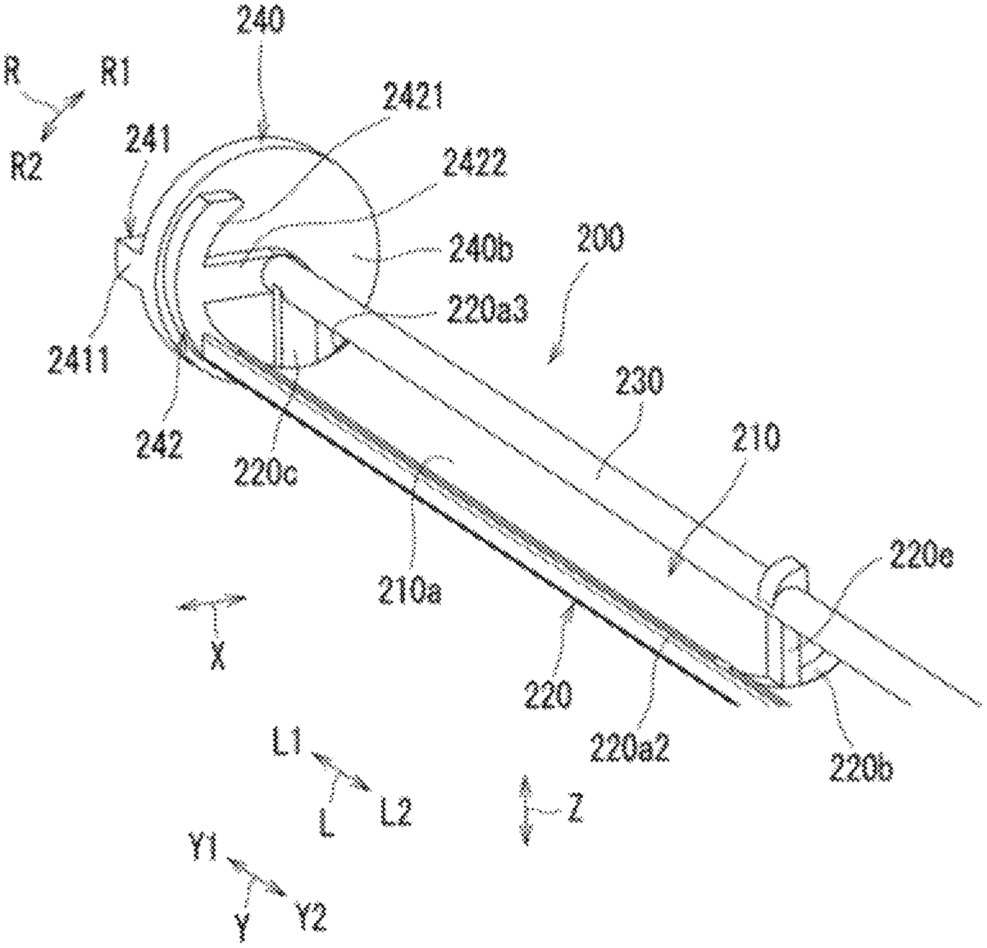
FIG. 7B is a perspective view of a front portion of a filter member, as viewed obliquely from above on a rear side.
Figure 8A:
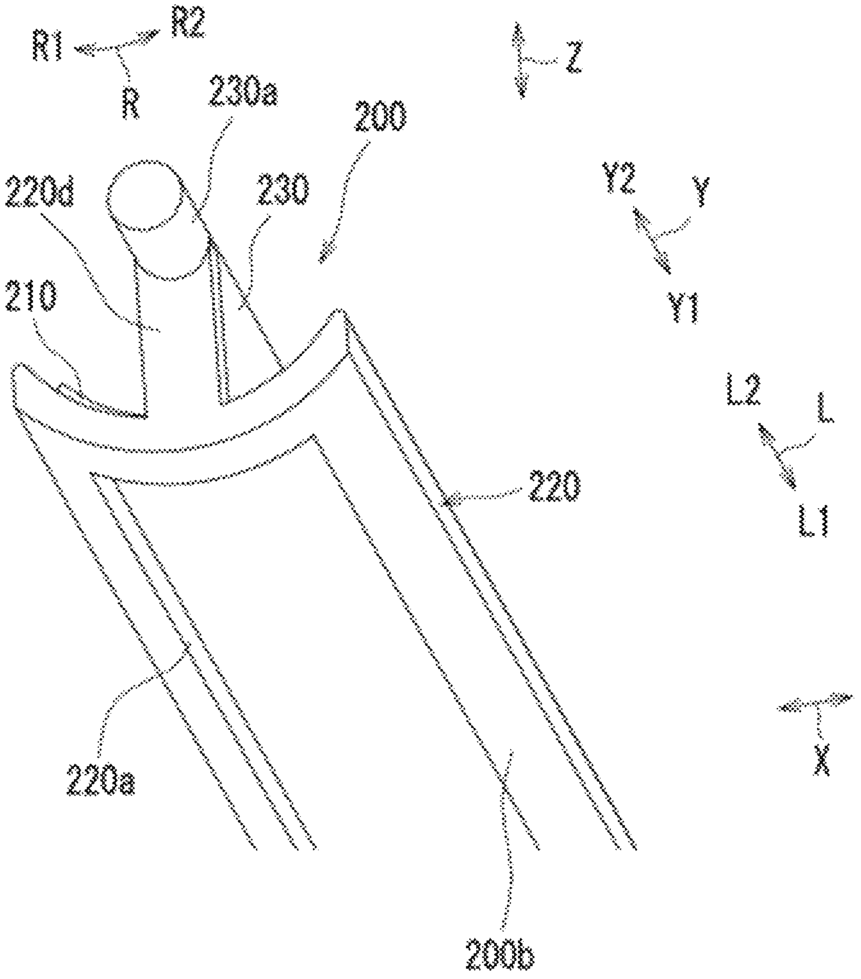
FIG. 8A is a perspective view of a rear portion of a filter member, as viewed obliquely from below on a rear side.
Figure 8B:
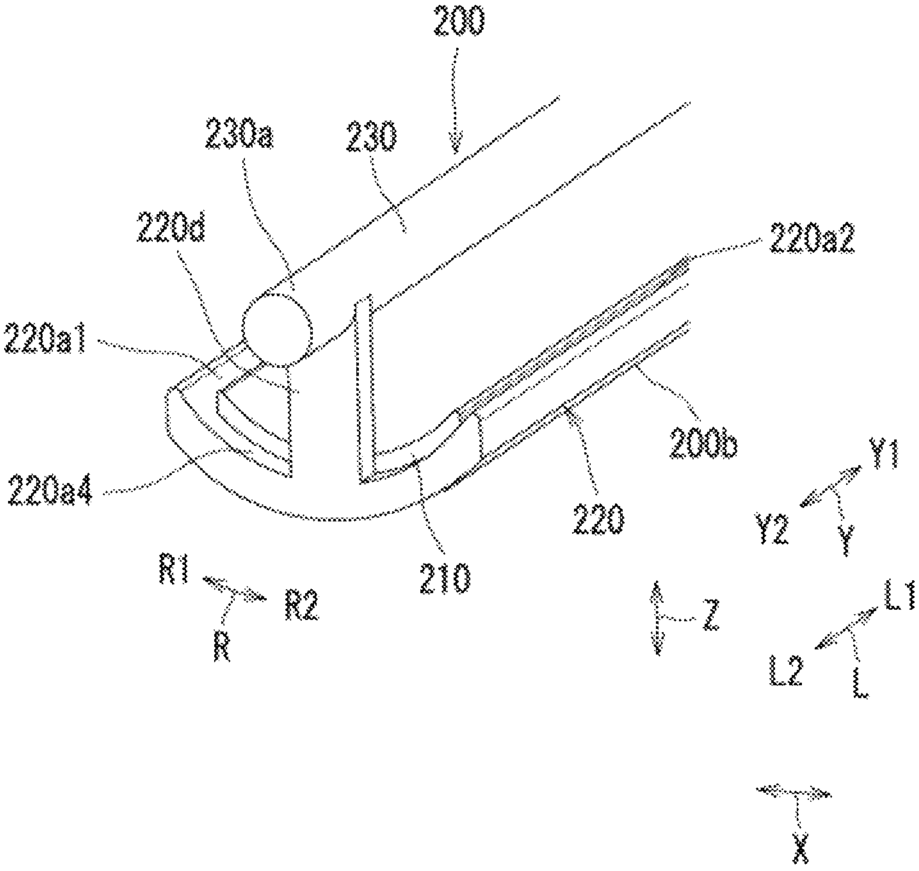
FIG. 8B is a perspective view of a rear portion of a filter member, as viewed obliquely from above on a rear side.

FIG. 7A and FIG. 7B are perspective views of the front (or front-side Y1) portion of the filter member 200, as viewed obliquely from above on the front side Y1 and obliquely from above on the rear side Y2, respectively. FIG. 8A and FIG. 8B are perspective views of the rear (or rear-side Y2) portion of the filter member 200, as viewed obliquely from below on the rear side Y2 and obliquely from above on the rear side Y2, respectively.

Figure 9A:
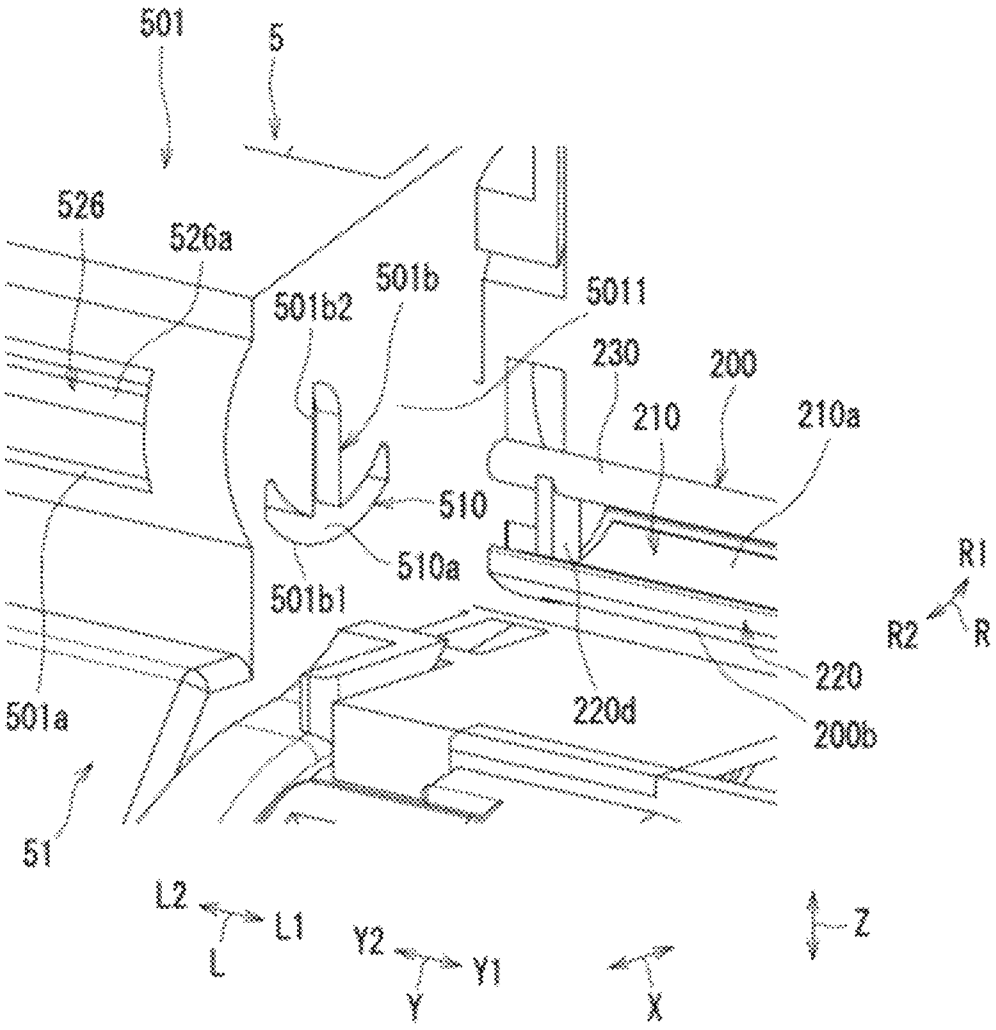
FIG. 9A is a perspective view depicting a portion of a developing device body, including an insertion port formed thereon, before a filter member is inserted into the developing device body in a first posture, as viewed obliquely from above on a front side and on a vent-opening side.
Figure 9B:
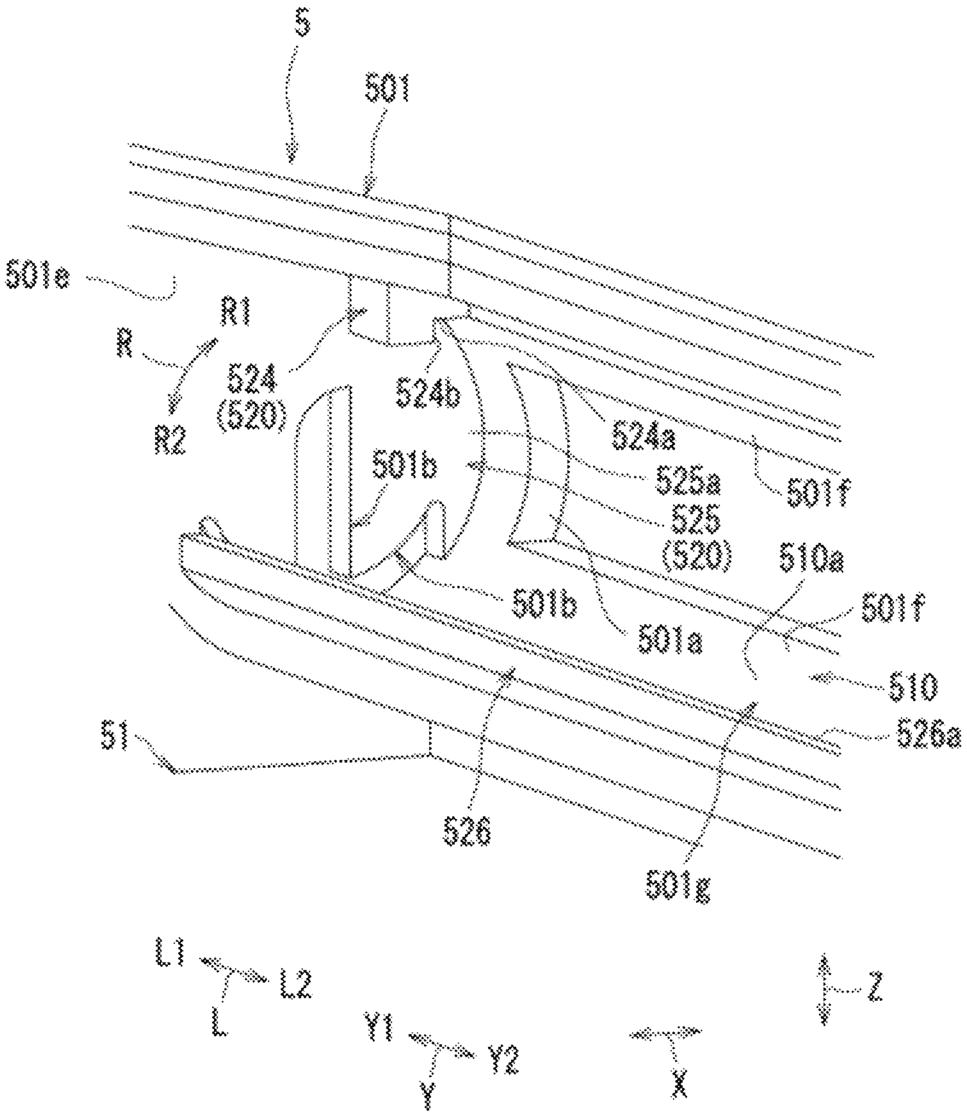
FIG. 9B is a perspective view depicting a portion of a developing device body, including an insertion port formed thereon, before a filter member is inserted into the developing device body in a first posture, as viewed obliquely from above on a rear side and on a side opposite to a vent-opening side.

FIG. 9A and FIG. 9B are perspective views depicting a portion of the developing device body 501, including an insertion port 501*b* formed thereon, before the filter member 200 is inserted into the developing device body 501 in the first posture, as viewed obliquely from above on the front side Y1 as well as a vent-opening (501*a*) side, and obliquely from above on the rear side Y2 as well as a side opposite to the vent-opening (501*a*) side, respectively.

Figure 10A:
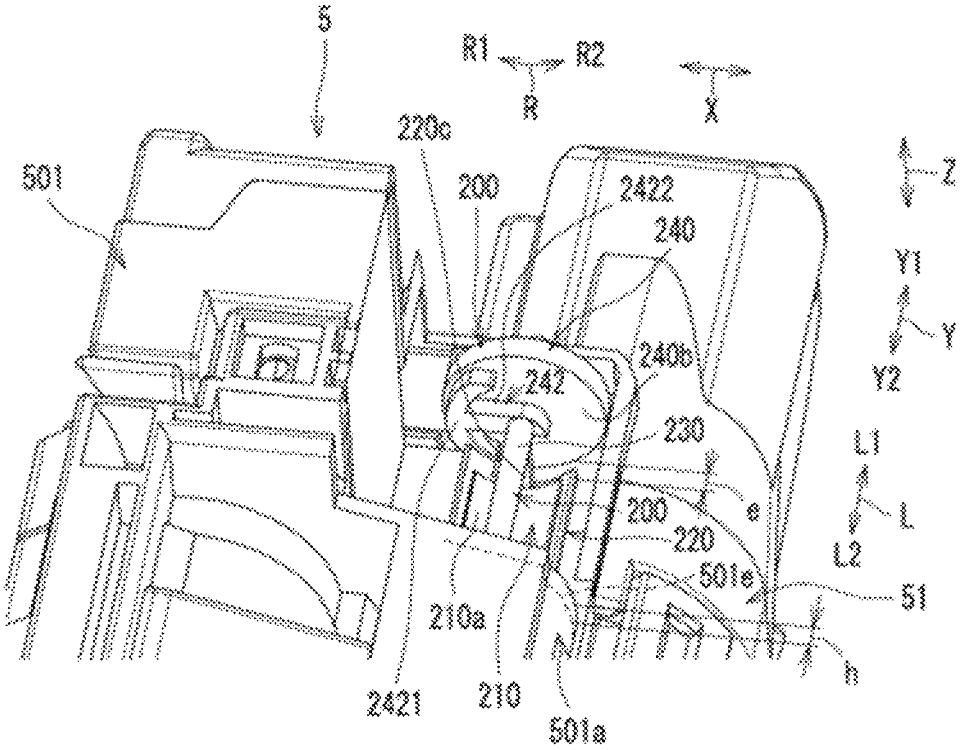
FIG. 10A is a perspective view depicting a portion of a filter member, including a grip formed thereon, in the middle of inserting the filter member into a developing device body in a first posture, as viewed from a rear side.

FIG. 10A is a perspective view depicting a portion of the filter member 200, including a grip 240 formed thereon, in the middle of inserting the filter member 200 into the developing device body 501 in the first posture, as viewed from the rear side Y2.

Figure 10B:
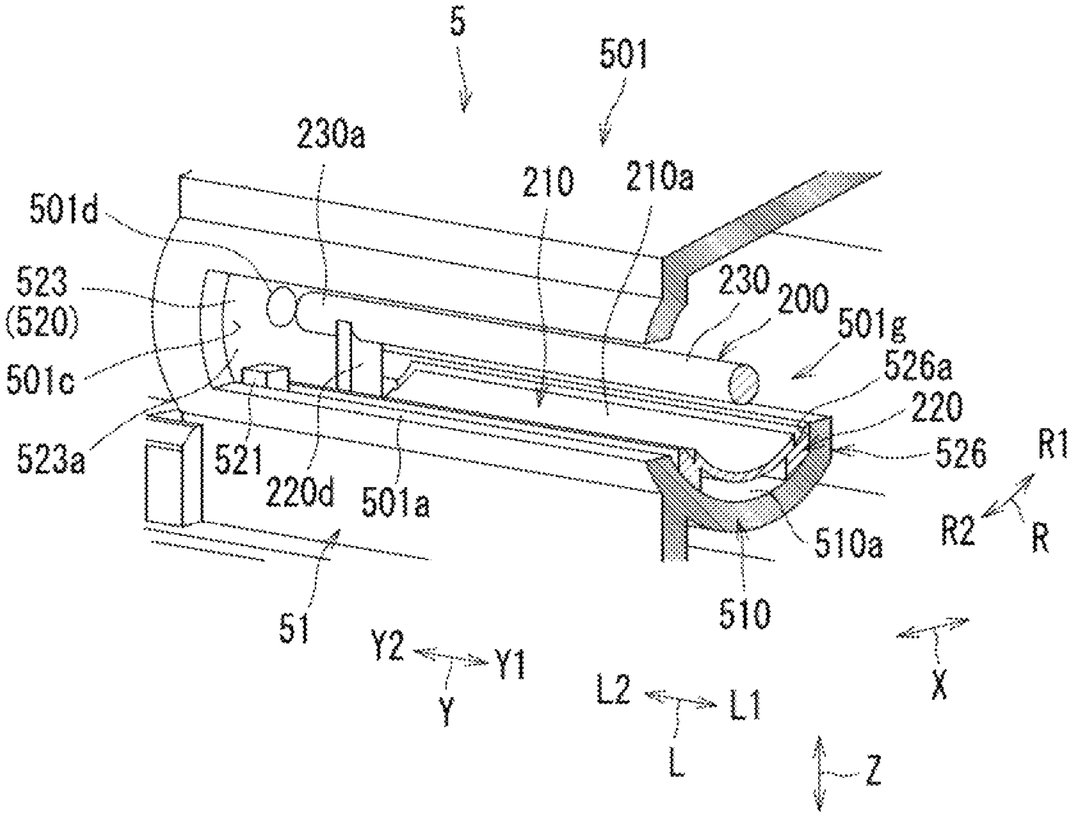
FIG. 10B is a perspective view depicting a rear portion of a filter member, in the middle of inserting the filter member into a developing device body in a first posture, as viewed from a vent-opening side.
Figure 10C:
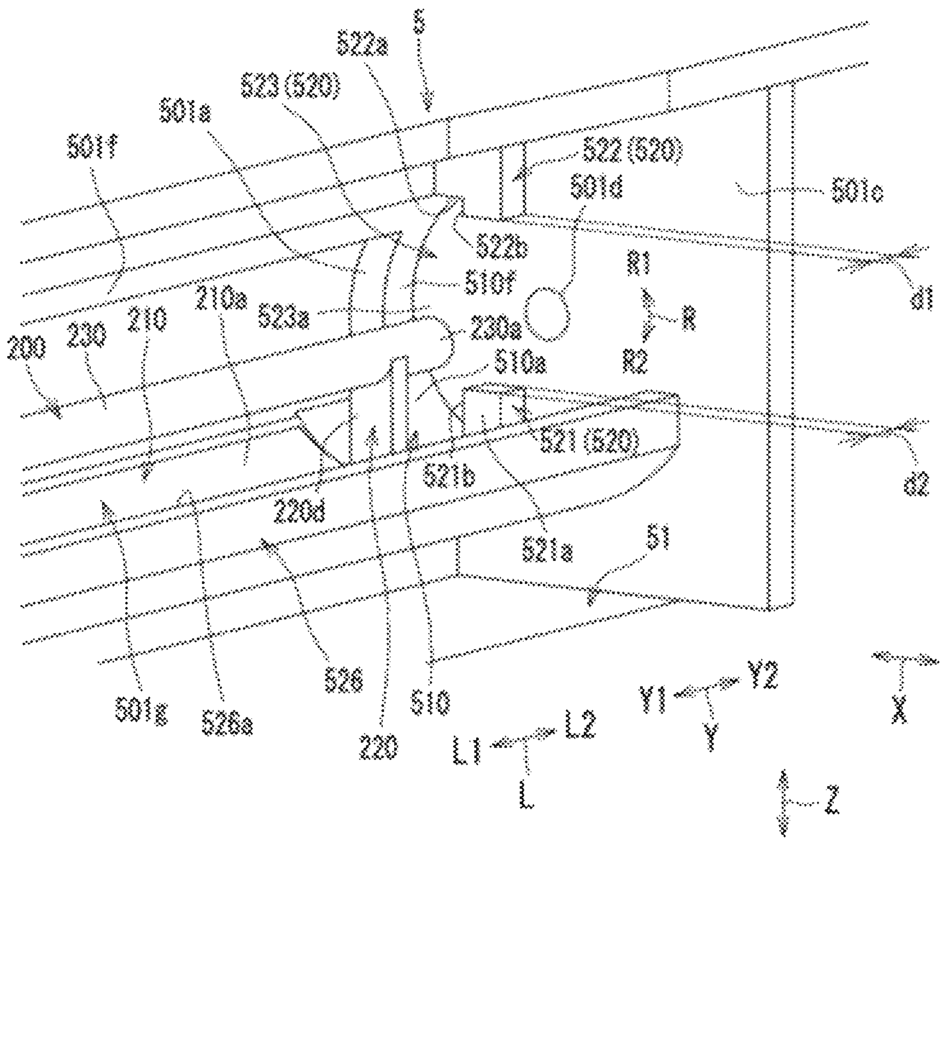
FIG. 10C is a perspective view depicting a rear portion of a filter member, in the middle of inserting the filter member into a developing device body in a first posture, as viewed from a side opposite to a vent-opening side.

FIGS. 10B and 10C are perspective views depicting the rear (or rear-side Y2) portion of the filter member 200, in the middle of inserting the filter member 200 into the developing device body 501 in the first posture, as viewed from the vent-opening (501*a*) side, and from the side opposite to the vent-opening (501*a*) side, respectively.

Figure 10D:
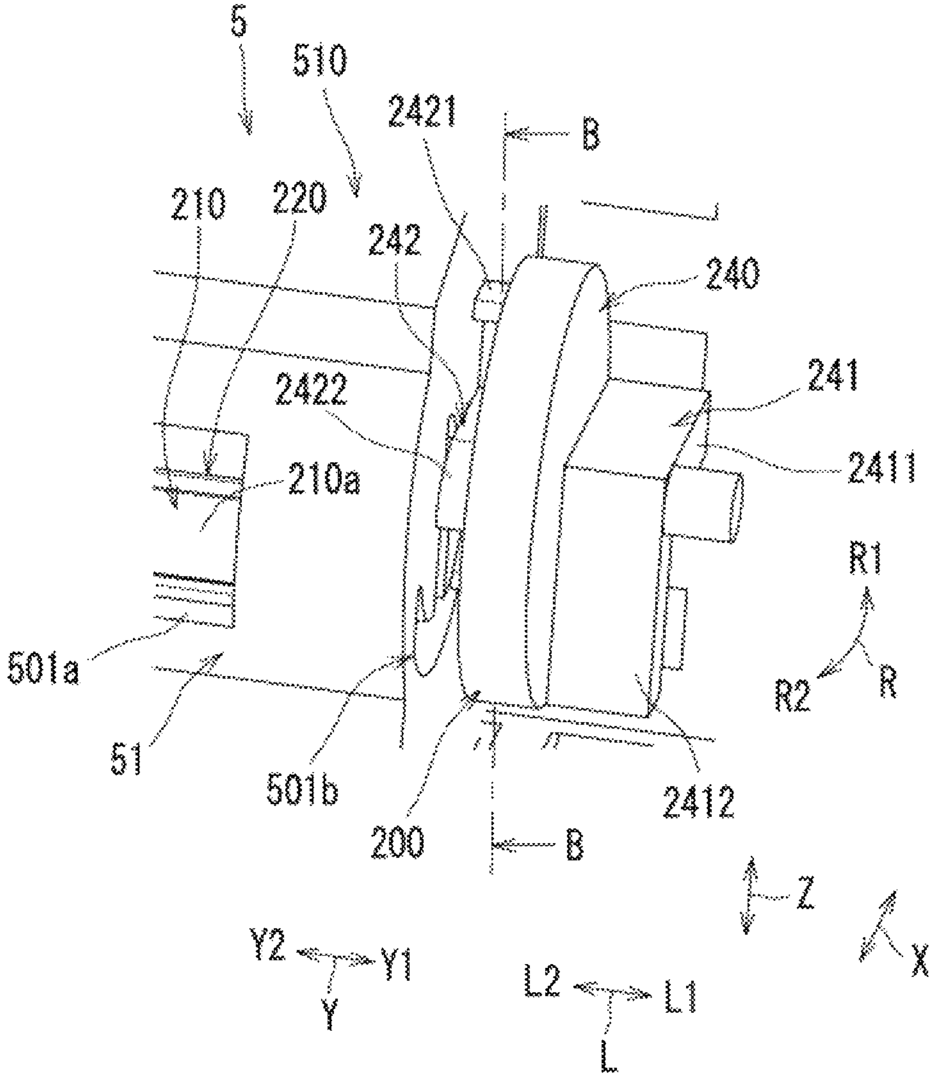
FIG. 10D is a perspective view depicting a portion of a grip in a state after a filter member is inserted into a developing device body in a first posture and before shifted to a second posture, as viewed from a lateral side.
Figure 10E:
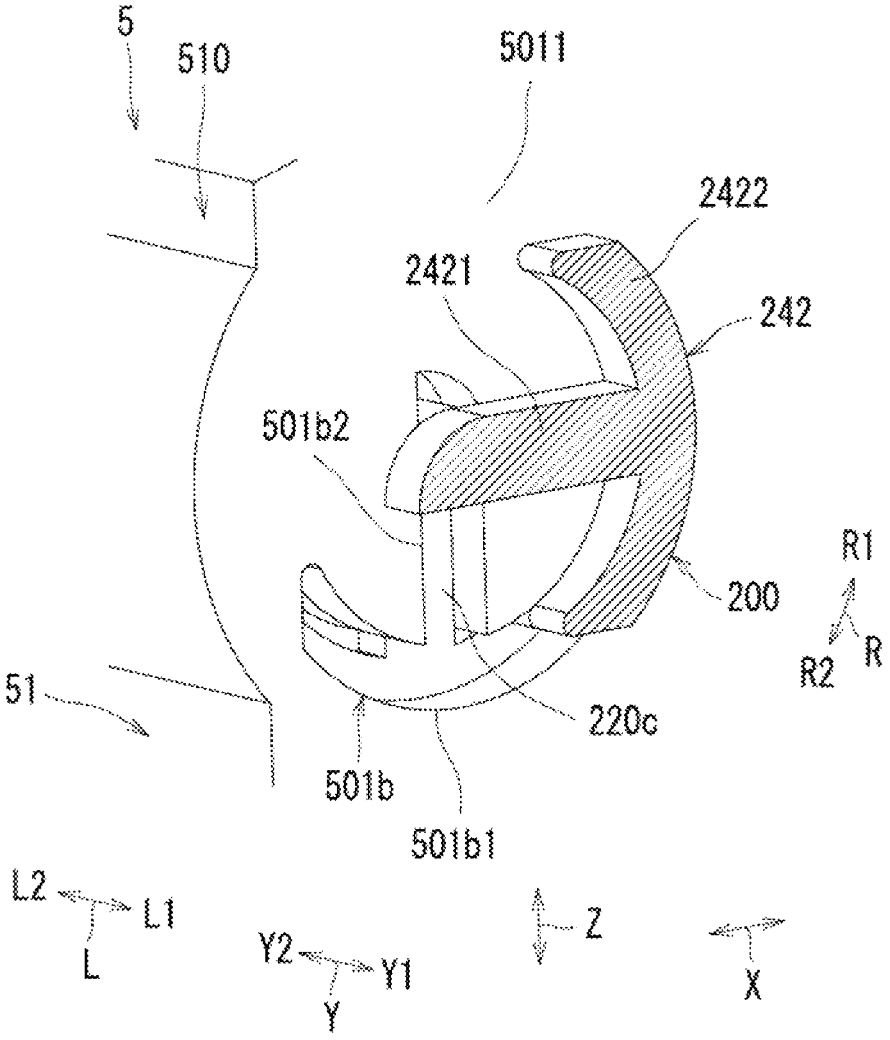
FIG. 10E is a perspective view depicting a plane of section taken along line B-B in FIG. 10D, as viewed from a front side.

FIG. 10D is a perspective view depicting a portion of the grip 240 in a state after the filter member 200 is inserted into the developing device body 501 in the first posture and before shifted to the second posture, as viewed from a lateral side. FIG. 10E is a perspective view depicting a plane of section taken along line B-B in FIG. 10D, as viewed from the front side Y1.

Figure 10F:
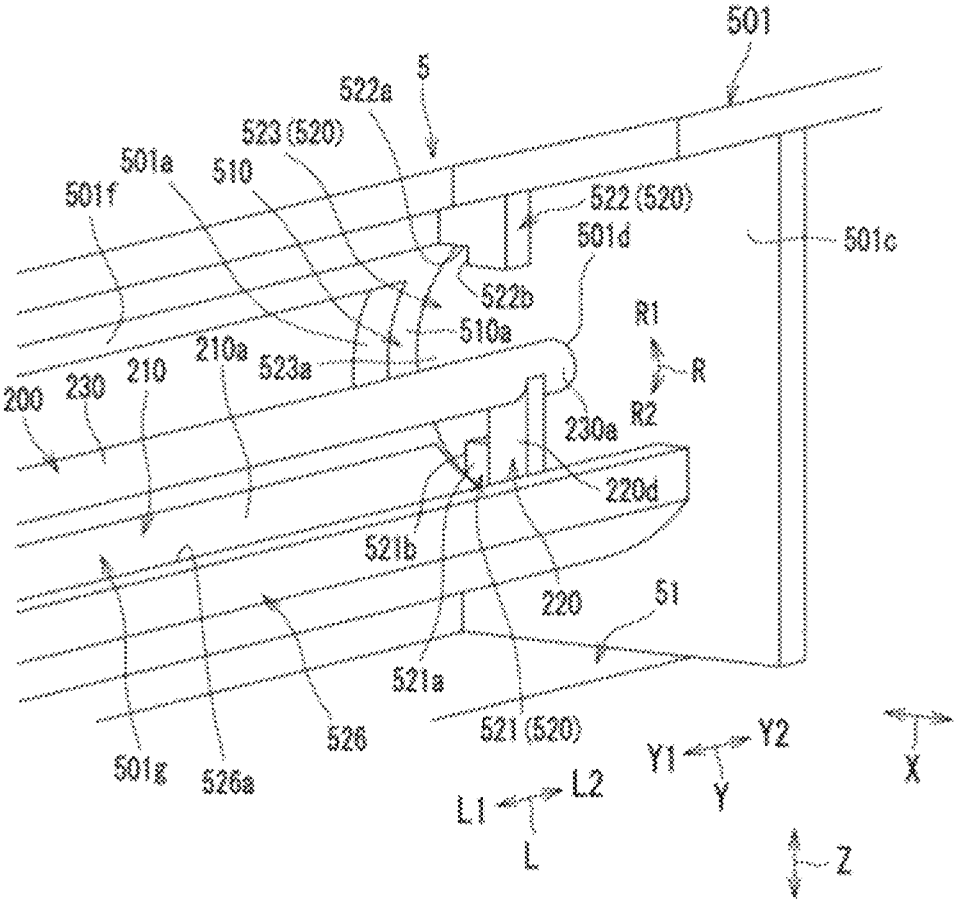
FIG. 10F is a perspective view depicting a rear portion of a filter member in a state after the filter member is inserted into a developing device body in a first posture and before shifted to a second posture, as viewed from a side opposite to a vent-opening side.
Figure 10G:
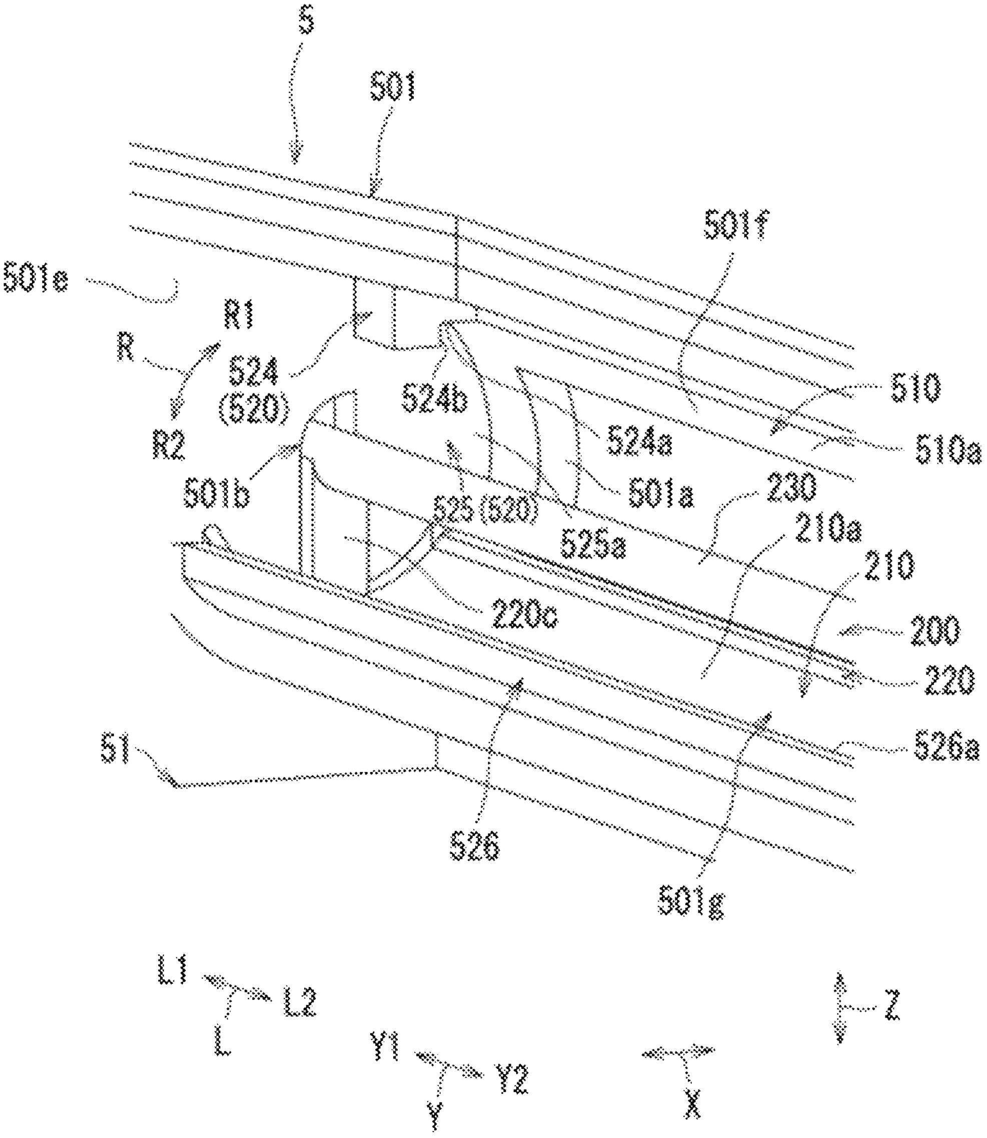
FIG. 10G is a perspective view depicting a front portion of a filter member in a state after the filter member is inserted into a developing device body in a first posture and before shifted to a second posture, as viewed from a side opposite to a vent-opening side.

FIGS. 10F and 10G are perspective views depicting the rear (or rear-side Y2) portion of the filter member 200 and the front (or front-side Y1) portion of the filter member 200, respectively, in a state after the filter member 200 is inserted into the developing device body 501 in the first posture and before shifted to the second posture, as viewed from the side opposite to the vent-opening (501*a*) side.

Figure 11A:
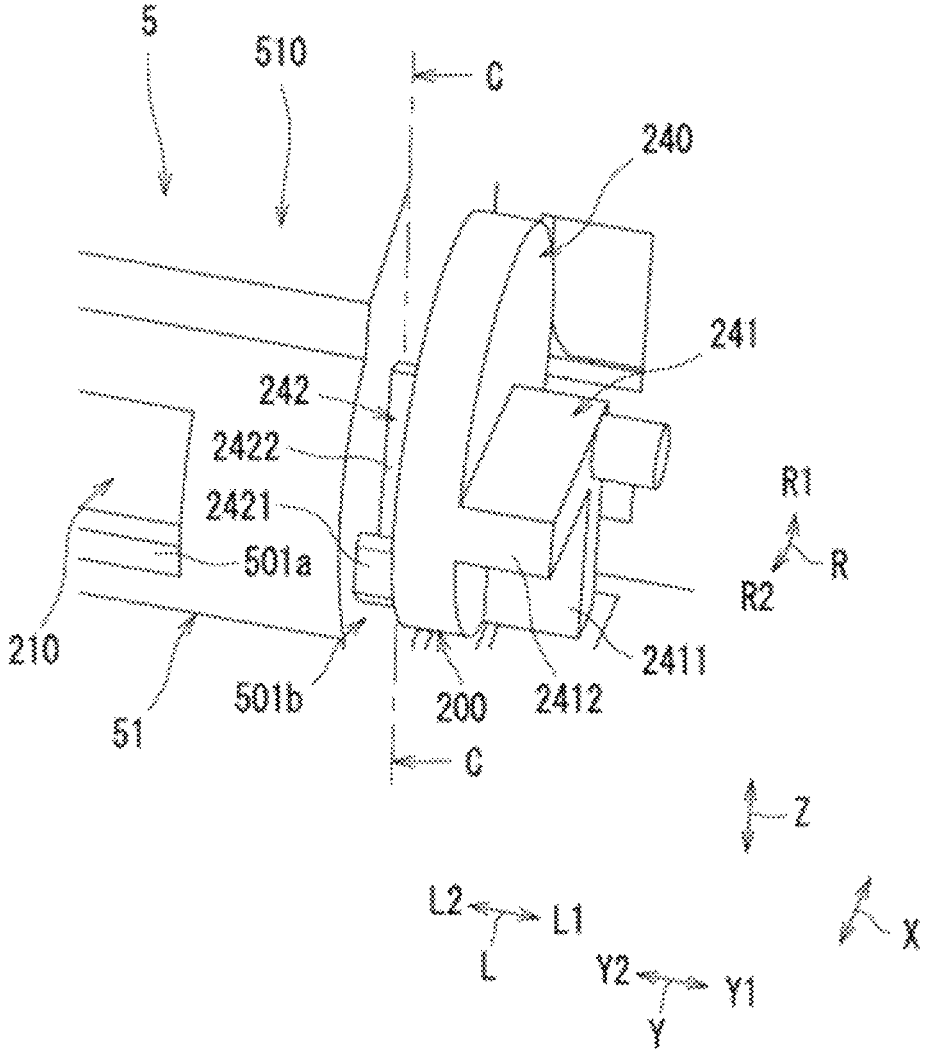
FIG. 11A is a perspective view depicting a portion of a grip in a state after a filter member is shifted from a first posture to a second posture and before pushed toward a rear side, as viewed from a vent-opening side.
Figure 11B:
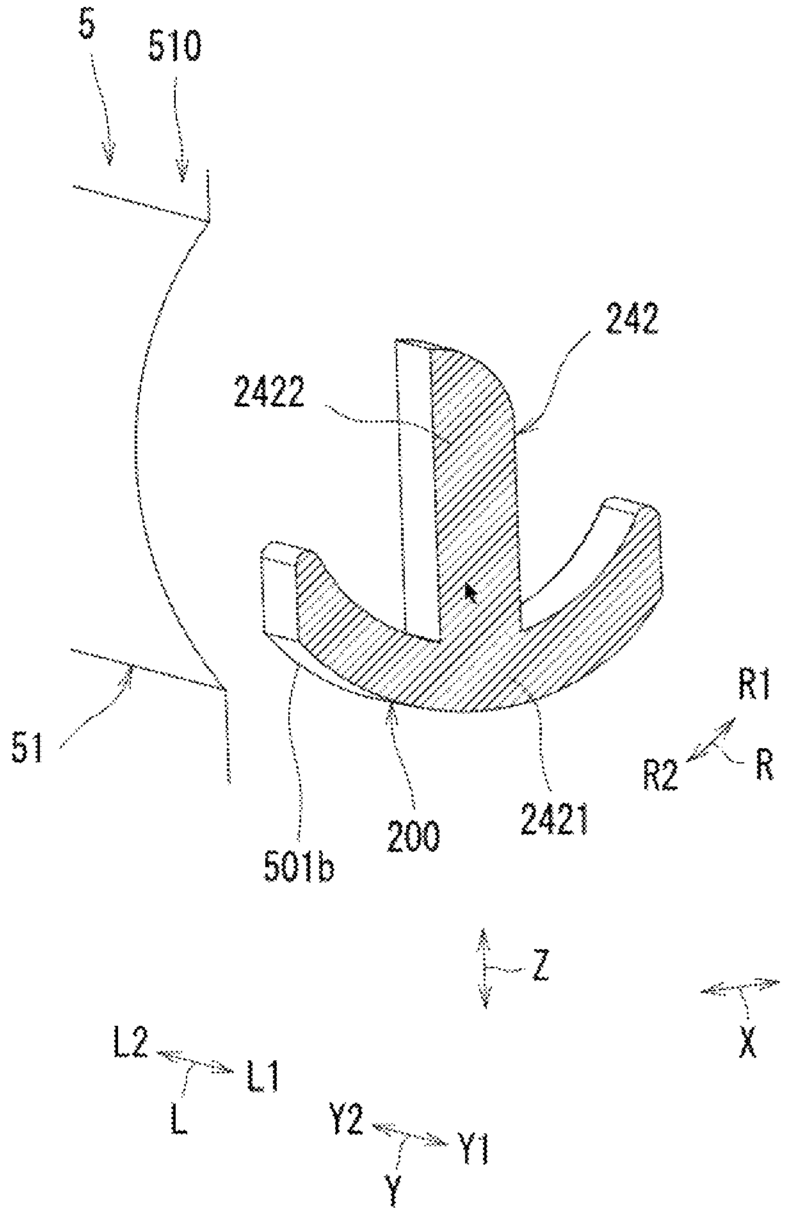
FIG. 11B is a perspective view depicting a plane of section taken along line C-C in FIG. 11A, as viewed from a front side.

FIG. 11A is a perspective view depicting a portion of the grip 240 in a state after the filter member 200 is shifted from the first posture to the second posture and before pushed toward the rear side Y2, as viewed from the vent-opening (501*a*) side. FIG. 11B is a perspective view depicting a plane of section taken along line C-C in FIG. 11A, as viewed from the front side Y1.

Figure 11C:
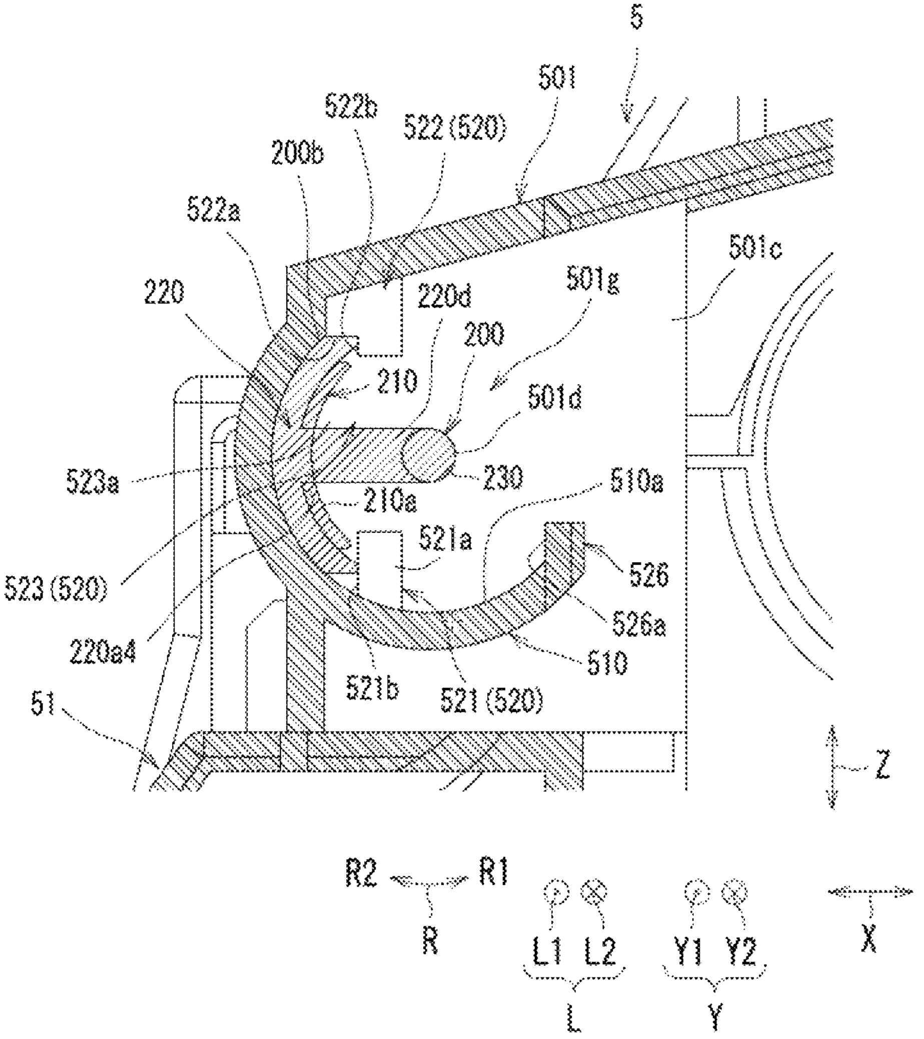
FIG. 11C is a sectional view depicting a filter member shifted to a second posture, that is cut in a vertical direction at a first restriction element and a second restriction element, located on a rear side of the filter member, as viewed from a front side.
Figure 11D:
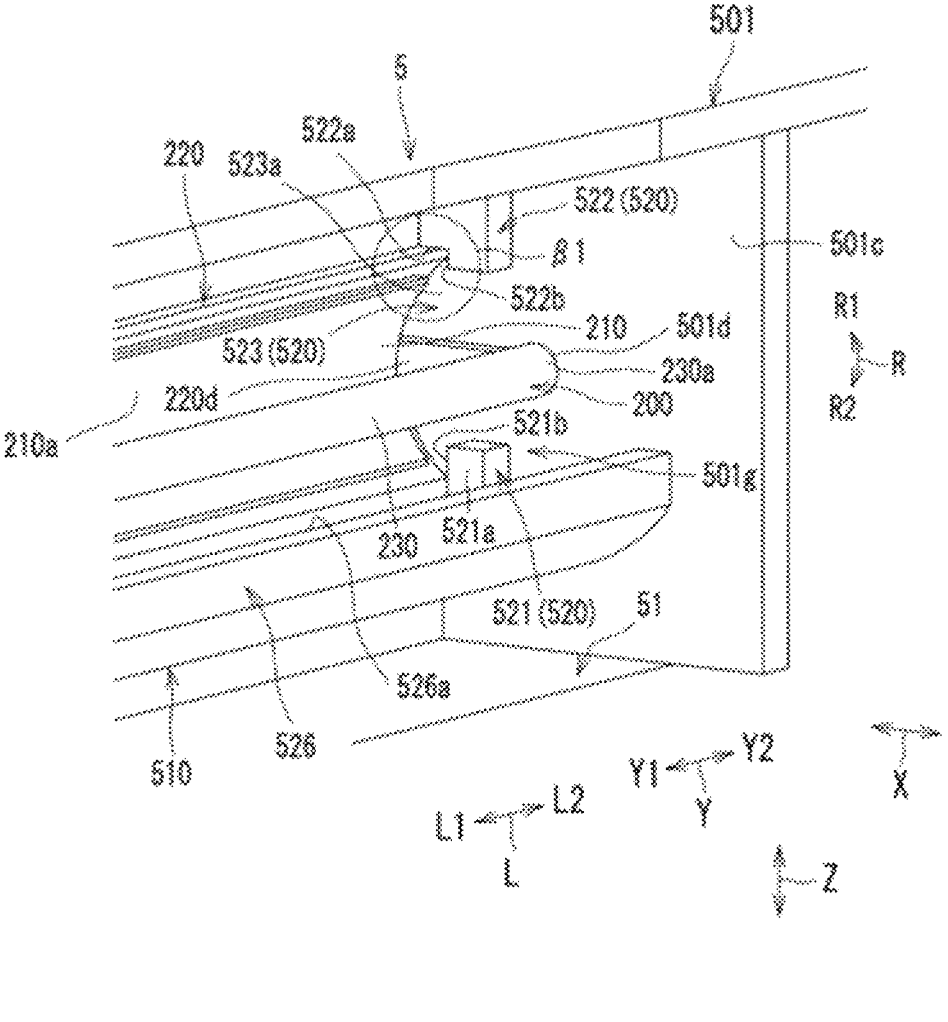
FIG. 11D is a perspective view depicting a rear portion of a filter member in a state after the filter member is shifted from a first posture to a second posture and before pushed toward a rear side, as viewed from a side opposite to a vent-opening side.
Figure 11E:
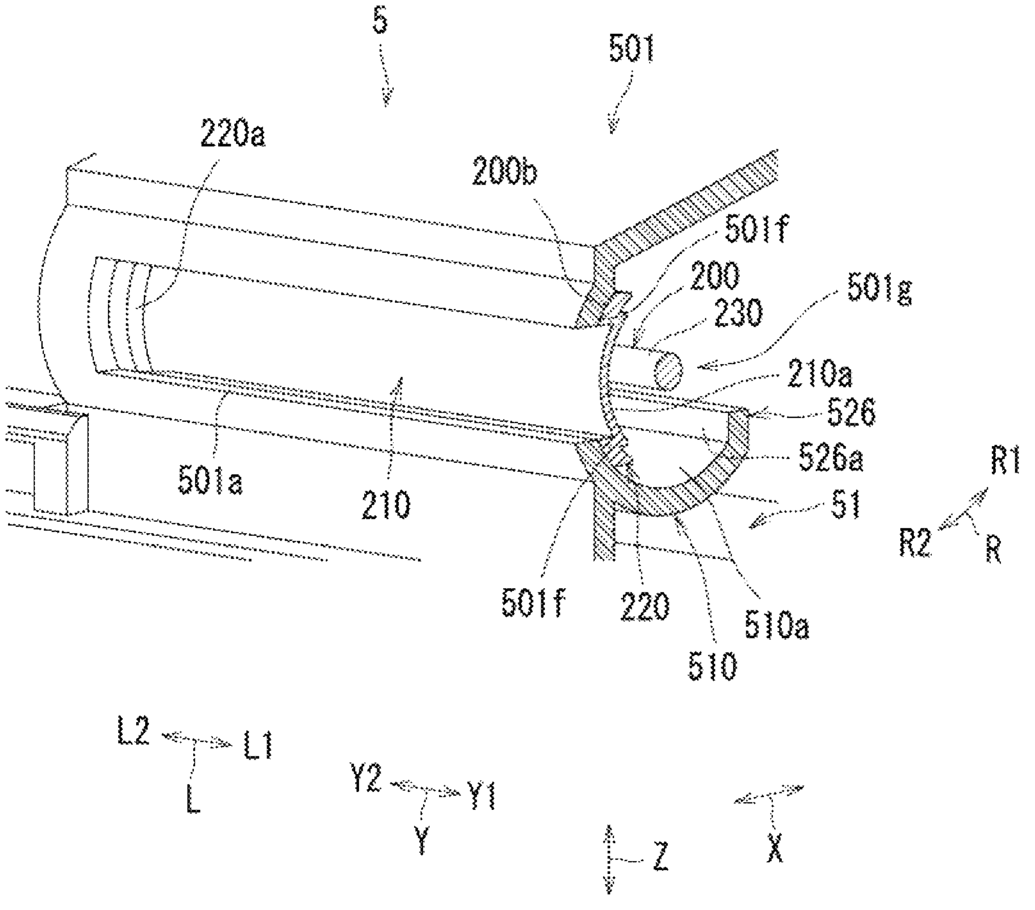
FIG. 11E is a perspective view depicting a rear portion of a filter member in a state after the filter member is shifted from a first posture to a second posture and before pushed toward a rear side, as viewed from a vent-opening side.
Figure 11F:
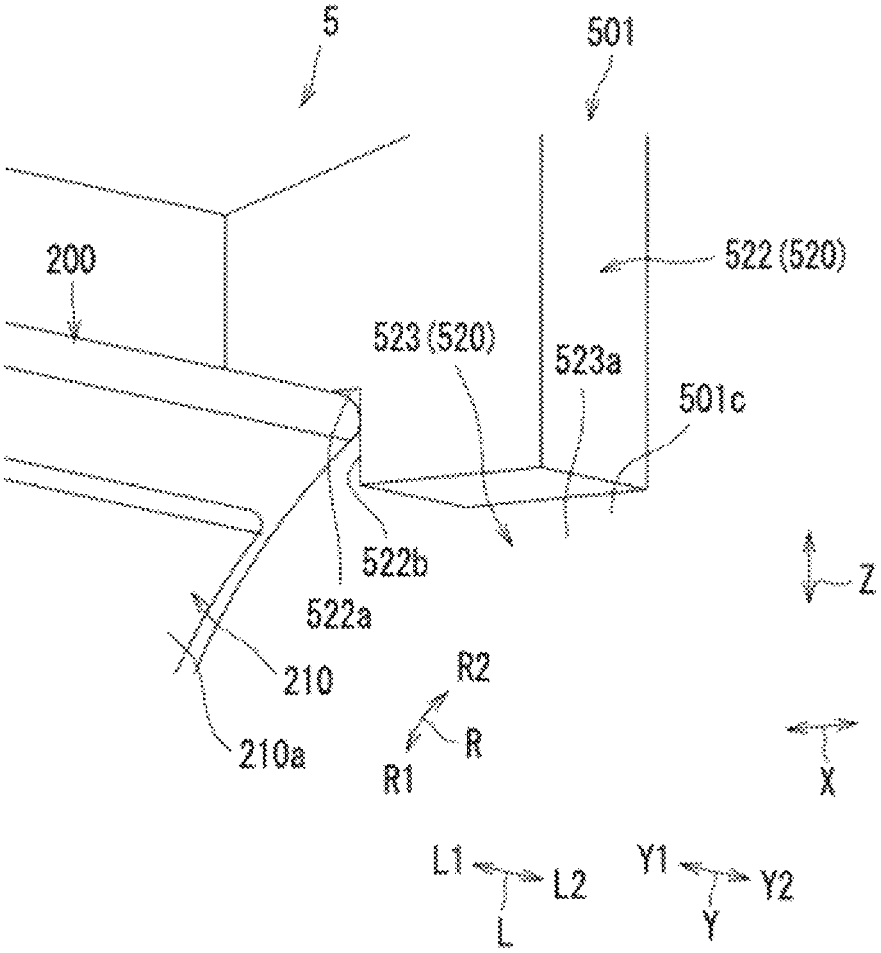
FIG. 11F is an enlarged perspective view of a portion β1 depicted in FIG. 11D.

FIG. 11C is a sectional view depicting the filter member 200 having been shifted to the second posture, that is cut in the vertical direction Z at a first restriction element 521 and a second restriction element 522, located on the rear side Y2 of the filter member 200, as viewed from the front side Y1. FIG. 11D and FIG. 11E are perspective views depicting the rear (or rear-side Y2) portion of the filter member 200 in a state after the filter member 200 is shifted from the first posture to the second posture and before pushed toward the rear side Y2, as viewed from the side opposite to the vent-opening (501*a*) side, and from the vent-opening (501*a*) side, respectively. FIG. 11F is an enlarged perspective view of a portion β1 depicted in FIG. 11D.

Figure 11G:
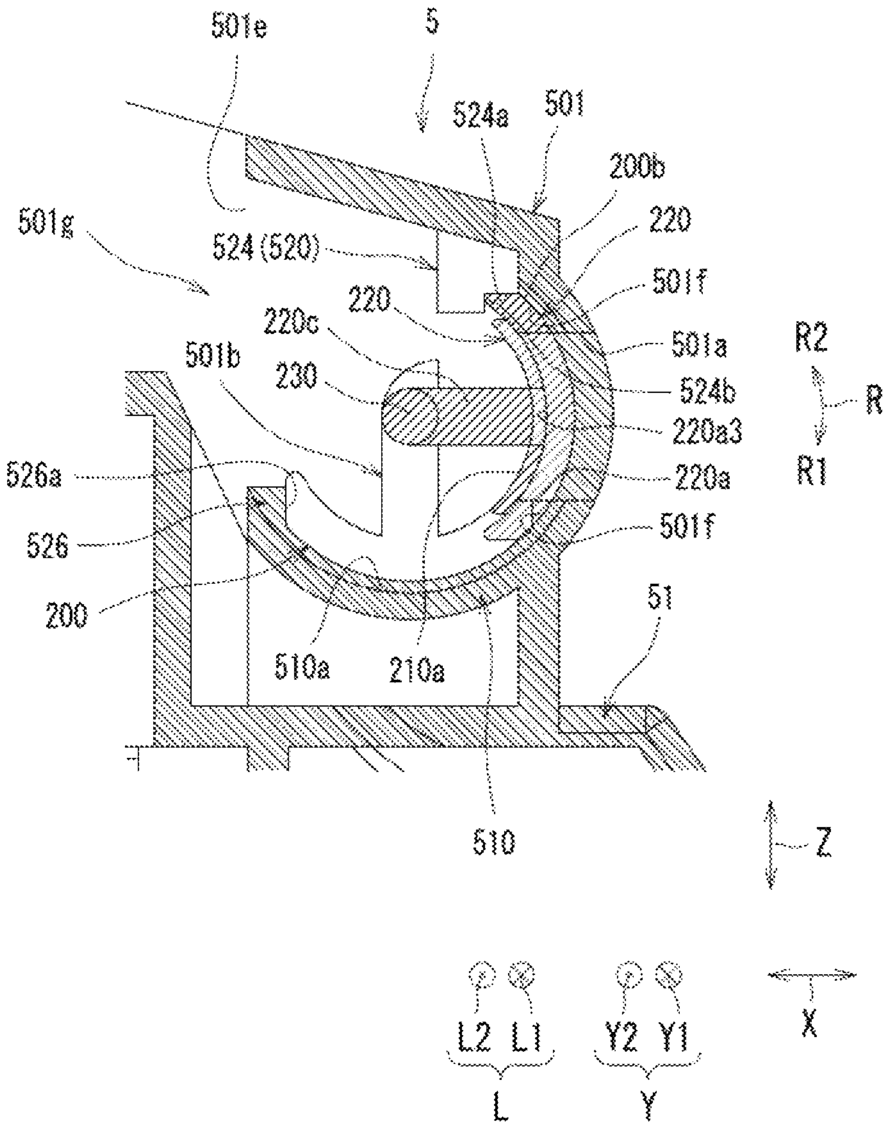
FIG. 11G is a sectional view depicting a filter member shifted to a second posture, that is cut in a vertical direction at a third restriction element, located on a front side of the filter member, as viewed from a rear side.

FIG. 11G is a sectional view depicting the filter member 200 having been shifted to the second posture, that is cut in the vertical direction Z at a third restriction element 523, located on the front side Y1 of the filter member 200, as viewed from the rear side Y2.

Figure 11H:
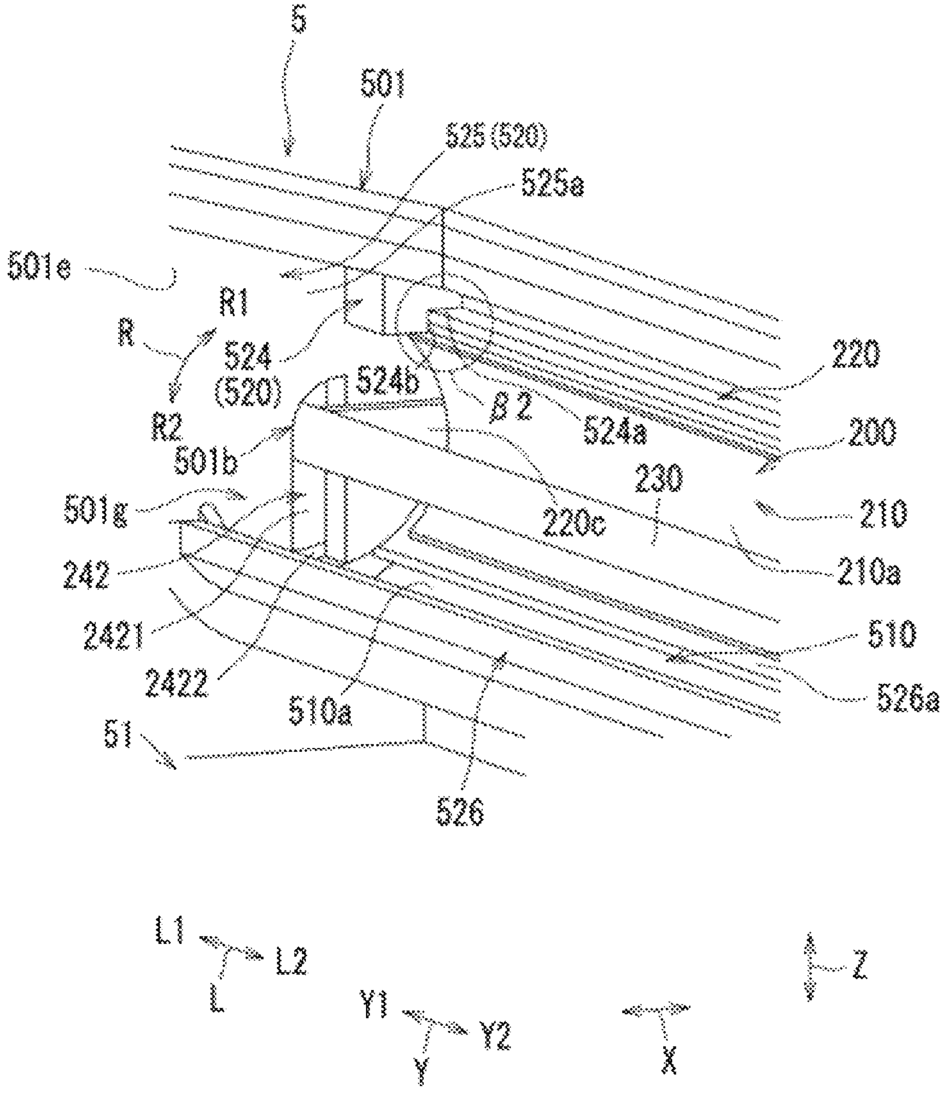
FIG. 11H is a perspective view depicting a front portion of a filter member in a state after the filter member is shifted from a first posture to a second posture and before pushed toward a rear side, as viewed from a side opposite to a vent-opening side.
Figure 11I:
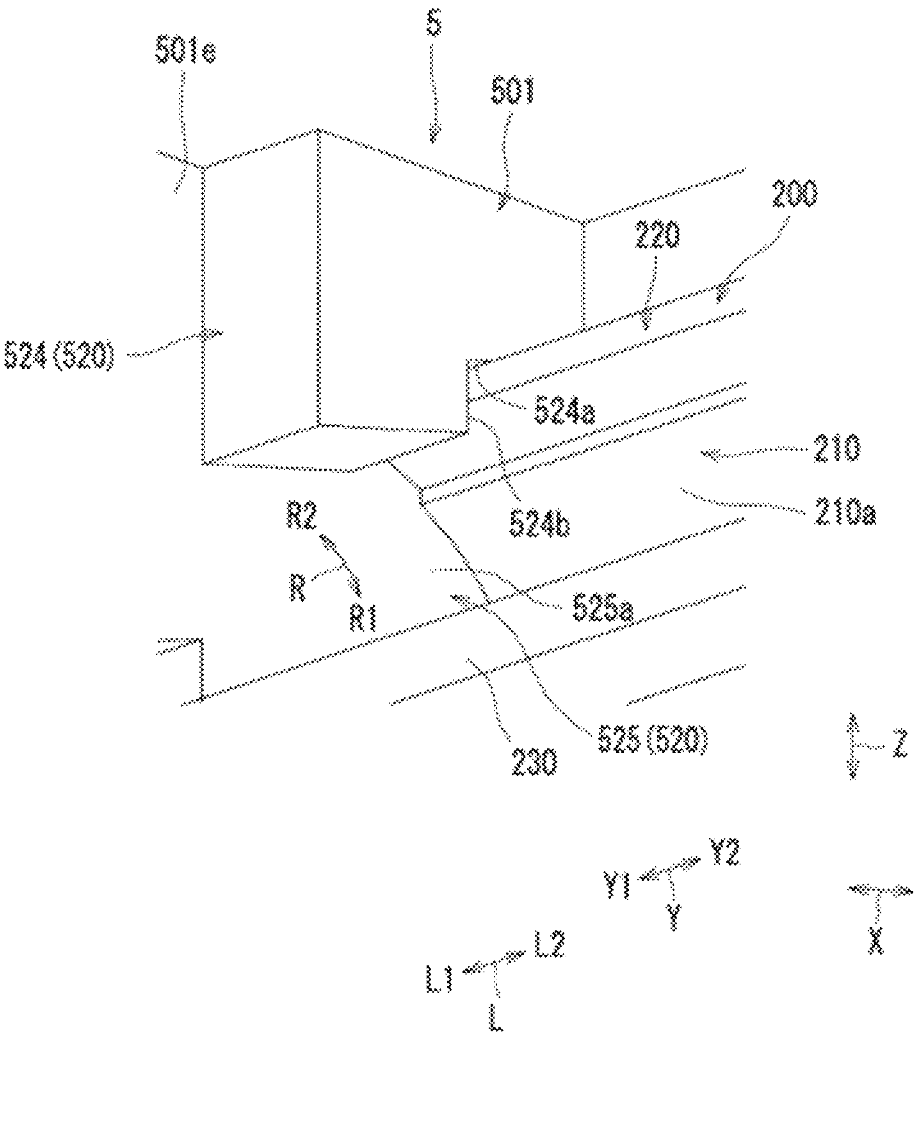
FIG. 11I is an enlarged perspective view of a portion β2 depicted in FIG. 11H.

FIG. 11H is a perspective view depicting the front (or front-side Y1) portion of the filter member 200 in a state after the filter member 200 is shifted from the first posture to the second posture and before pushed toward the rear side Y2, as viewed from the side opposite to the vent-opening (501*a*) side. FIG. 11I is an enlarged perspective view of a portion β2 depicted in FIG. 11H.

Figure 12A:
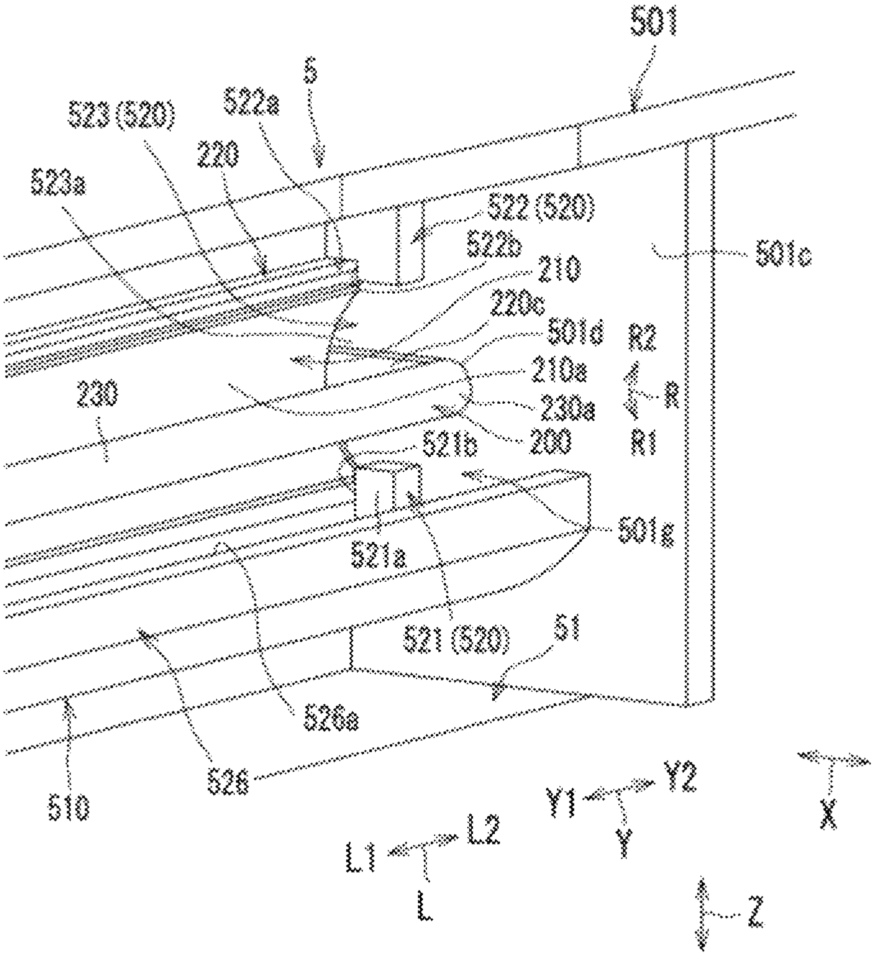
FIG. 12A is a perspective view depicting a rear portion of a filter member in a state after the filter member is shifted from a first posture to a second posture and is pushed toward a rear side, as viewed from a side opposite to a vent-opening side.
Figure 12B:
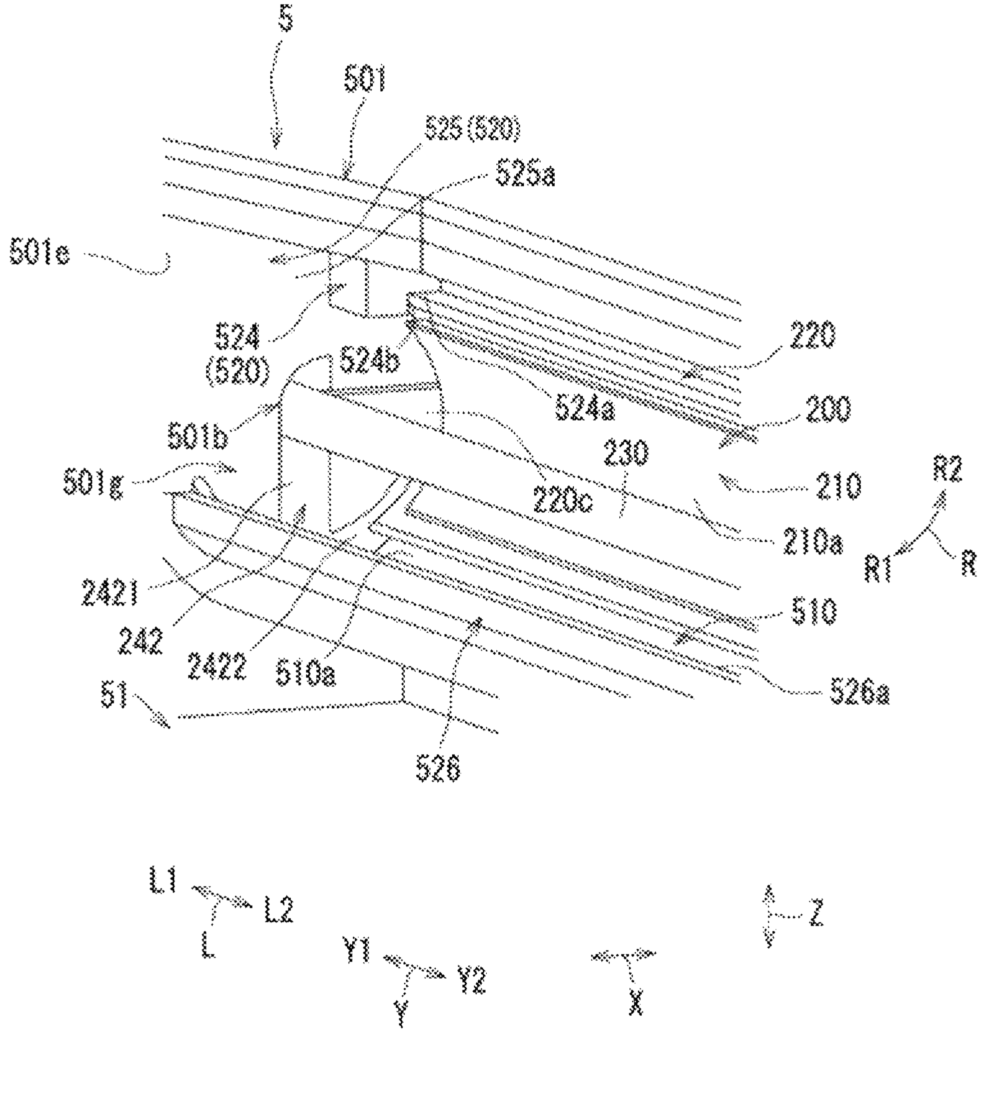
FIG. 12B is a perspective view depicting a front portion of a filter member in a state after the filter member is shifted from a first posture to a second posture and is pushed toward a rear side, as viewed from a side opposite to a vent-opening side.

FIG. 12A and FIG. 12B are perspective views depicting the rear (or rear-side Y2) portion of the filter member 200 and the front (or front-side Y1) portion of the filter member 200, respectively, in a state after the filter member 200 is shifted from the first posture to the second posture and is pushed toward the rear side Y2, as viewed from the side opposite to the vent-opening (501*a*) side.

First Embodiment

In the present embodiment, the developing device body 501 and the vent opening 501*a* extend in a predetermined longitudinal direction L (in this example, front-rear direction Y). Accordingly, the filter member 200 also extends in the longitudinal direction L. In this respect, the front-rear direction Y is defined in that the front side Y1 is a side on which a user performs operation on the image forming apparatus 100 (i.e., an operation side), and the rear side Y2 is a side opposite to the operation side. The filter member 200 is provided so as to be insertable into and removable from the developing device body 501 along the longitudinal direction L in a condition where the developing device 5 is mounted on the image forming apparatus body 101.

In this configuration, the filter member 200 is inserted into or removed from the developing device body 501 in the longitudinal direction L in a condition where the developing device 5 is mounted on the image forming apparatus body 101. Thus, a user can insert and remove the filter member 200 into and from the developing device body 501 in the condition where the developing device 5 is mounted on the image forming apparatus body 101, and consequently, the replacement work of the filter member 200 by the user can be simplified.

Second Embodiment

In the present embodiment, the filter member 200 includes a retainer 220 and a rotating shaft 230. The retainer 220 retains the filter 210 so as to make the filter 210 into an arc shape. The inner surface 210*a* of the filter 210 is a concave surface. The rotating shaft 230 is located facing the inner surface 210*a* of the filter 210, and supports the retainer so as to be rotatable with a center of the arc shape as a rotation axis a (see FIG. 2).

In this configuration, the filter member 200 includes the retainer 220 for retaining the filter 210 and the rotating shaft 230 for supporting the retainer 220, which makes it possible to smoothly shift the filter member 200 between the first posture and the second posture, and consequently, it is possible to improve user operability of changing the posture of the filter member 200 between the first posture and the second posture.

Third Embodiment

In the present embodiment, the filter member 200 is rotatable about the rotation axis a between the first posture and the second posture in a state where the filter member 200 is inserted into the developing device body 501.

In this configuration, the filter member 200 is rotatable about the rotation axis a, which makes it possible to smoothly and reliably move the filter member 200 along a circumferential direction (or rotation direction R) about the rotation axis a between the first posture and the second posture in a state of being inserted into the developing device body 501, and consequently, it is possible to further improve the user operability of changing the posture of the filter member 200 between the first posture and the second posture.

Note that rotation angle θ (see FIG. 7A) at which the filter member 200 rotates between the first posture and the second posture can be appropriately set according to the location of the vent opening 501*a*, and for example, may be set at plus or minus 30 degrees, plus or minus 45 degrees, plus or minus 60 degrees, plus or minus 90 degrees, or plus or minus 180 degrees. That is, the rotation angle θ can be any angle between plus or minus 30 degrees and plus or minus 180 degrees. For example, when the rotation angle θ is plus or minus 180 degrees, the vent opening 501*a* can be provided on a top side, which enables air to be easily released. In the illustrated example, the rotation angle θ is set at plus 90 degrees, defined rotating closer to the vent opening 501*a*.

Specifically, the retainer 220 is provided with an opening 220*a* extending along the longitudinal direction L (or direction of rotation axis a; in this example, front-rear direction Y). The opening 220*a* of the retainer 220 communicates with the vent opening 501*a* of the developing device body 501 in a state where the filter member 200 is in the second posture (see FIG. 11G). The filter 210 is provided inside the retainer 220 so as to entirely cover the opening 220*a* of the retainer 220. The filter 210 is fixed at inside of the retainer 220 by, for example, an adhesive or the like.

The retainer 220 is provided with one or more of (four, in this example) first reinforcing elements 220*b* to 220*b* (see FIGS. 5A to 7B). The first reinforcing elements 220*b* to 220*b* serve to reinforce strength of the opening 220*a* along the rotation direction R about the rotation axis a. This configuration makes it possible to improve the strength of the opening 220*a* by the first reinforcing elements 220*b* to 220*b*. In this example, the first reinforcing elements 220*b* to 220*b* extend in an arc shape with curvature radius identical to that of the retainer 220, and are joined, as seen in the rotation direction R, between a first edge frame 220*al* (see FIG. 8B) on one side (R1) of the opening 220*a* and a second edge frame 220*a*2 (see FIG. 8B) on another side (R2) thereof.

The retainer 220 is provided with a pair of supports 220*c* and 220*d* sustained by the rotating shaft 230. The supports 220*c*, 220*d* extend in a radial direction of the rotating shaft 230. The support 220*c* on one side (or front side Y1) is joined between the rotating shaft 230 and a third edge frame 220*a*3 on one side L1 (or front side Y1) of the opening 220*a* as seen in the longitudinal direction L. The support 220*d* on another side (or rear side Y2) is joined between the rotating shaft 230 and a fourth edge frame 220*a*4 on another side L2 (or rear side Y2) of the opening 220*a* as seen in the longitudinal direction L.

The retainer 220 is provided with a plurality of (four, in this example) reinforcing supports 220*e* to 220*e* sustained by the rotating shaft 230. The reinforcing supports 220*e* to 220*e* extend in the radial direction of the rotating shaft 230 and are joined between the rotating shaft 230 and a plurality of first reinforcing elements 220*b* to 220*b*.

The rotating shaft 230 is a columnar member extending in the longitudinal direction L. A grip 240 is provided at an end of one side L1 (or front side Y1) of the rotating shaft 230 as seen in the longitudinal direction L. Thus, the user can reliably operate the filter member 200 by gripping the grip 240. In this example, the grip 240 is shaped as a circular disc with a diameter larger than the diameter of the rotating shaft 230. The grip 240 is provided at the end of one side L1 of the rotating shaft 230 so as to be coaxial with the rotating shaft 230. Consequently, the user can rotate the grip 240 with good operability.

The grip 240 is provided with an indicator 241 for allowing the user to recognize whether the filter member 200 is in the first posture or the second posture. The indicator 241 functions as a grip to be gripped by the user. In this example, the indicator 241 is provided on a first surface 240*a* (see FIG. 7A) on one side L1 (or front side Y1) of the grip 240 as seen in the longitudinal direction L.

The indicator 241 includes a first indicator 2411. The first indicator 2411 is located at a predetermined first position in the rotation direction R (in this example, a position along the left-right direction X) when the filter member 200 is in the first posture, and is located at a predetermined second position intersecting the direction (X) of the first position (in this example, a position along the up-down direction Z) when the filter member 200 is in the second posture. The indicator 241 further includes a second indicator 2412. The second indicator 2412 is located at the second position when the filter member 200 is in the first posture, and is located at the first position when the filter member 200 is in the second posture. In this example, the indicator 241 has an L-shape formed by the first indicator 2411 and the second indicator 2412, and the rotating shaft 230 (or rotation axis a) is located at a joint of the first indicator 2411 and the second indicator 2412.

The rotating shaft 230 is integrally provided with the reinforcing supports 220*e* to 220*e* so as to be disposed at equal intervals in the longitudinal direction L between the supports 220*c*, 220*d* provided at opposite sides as seen in the longitudinal direction L.

The developing device body 501 is provided with a guide 510 for slidably guiding the filter member 200 in the longitudinal direction L. The guide 510 is provided with a guide surface 510*a* formed into a shape identical or generally identical to the shape of outer surface 200*b* of the filter member 200 (in this example, an arc shape with curvature radius identical or generally identical to the retainer 220).

The developing device body 501 is provided, on a first wall 501*c* located at the other side L2 (or rear side Y2) as seen in the longitudinal direction L, with an insertion hole 501*d* into which an end 230*a* of the rotating shaft 230 at the other side L2 (or rear side Y2) in the longitudinal direction L is inserted. A diameter of the insertion hole 501*d* is larger than a diameter of the rotating shaft 230 by a predetermined size in an extent allowing the end 230*a* of the rotating shaft 230 to be inserted or pulled out with the end 230*a* of the rotating shaft 230 sliding therethrough.

The above configuration makes it possible to more smoothly shift the filter member 200 between the first posture and the second posture, and consequently, it is possible to further improve the user operability of changing the posture of the filter member 200 between the first posture and the second posture.

Fourth Embodiment

In the present embodiment, the filter member 200 is held on the developing device body 501 by an operation that the filter member 200 is pushed in an insertion direction (toward the other side L2) of the longitudinal direction L while keeping the second posture. Thus, the developing device body 501 includes a holding structure 520 for holding the filter member 200 on the developing device body 501.

In this configuration, it is possible to hold the filter member 200 on the developing device body 501 by a simple operation of pushing the filter member 200 in the insertion direction (toward the other side L2) of the longitudinal direction L in a state where the filter member 200 is in the second posture.

Specifically, the developing device body 501 is provided with a first restriction element 521 to a fifth restriction element 525 (see FIGS. 9B, 10C, 10F, 10G, 11C, 11D, and 11F to 12B). The holding structure 520 is configured with a first restriction element 521 to a fifth restriction element 525.

First Restriction Element

The first restriction element 521 is provided with a first restriction surface 521*a* and a second restriction surface 521*b*. The first restriction surface 521*a* restricts the movement of the filter member 200 in the first posture toward the other side L2 (or rear side Y2) in the longitudinal direction L. Specifically, the first restriction surface 521*a* comes into abutment with the fourth edge frame 220*a*4 of the filter member 200 when the filter member 200 is inserted into the developing device body 501 in the first posture, and thereby restricts the movement of the filter member 200 in the first posture toward the other side L2 (rear side Y2). In this example, the movement of the filter member 200 in the first posture toward the other side L2 (rear side Y2) in the longitudinal direction L is also restricted by a blocking element 242 (described later) coming into abutment with an insertion-side surface 5011 (front surface, in this example) of the developing device body 501 (see FIGS. 9A and 10E). The second restriction surface 521*b* restricts the rotation of the filter member 200 in a first rotation direction R1 as a rotation direction toward the first posture from the second posture, so as to maintain the second posture after the filter member 200 is shifted from the first posture to the second posture.

In this example, the first restriction element 521 is provided at a corner area between the first wall 501*c* and the bottom of the guide 510. The first restriction surface 521*a* extends orthogonally to the longitudinal direction L. Thus, the first restriction surface 521*a* can effectively prevent the filter member 200 in the first posture from moving toward the other side L2 (rear side Y2) in the longitudinal direction L. The second restriction surface 521*b* extends orthogonally to the left-right direction X. The second restriction surface 521*b* restricts the rotation of the filter member 200 in the first rotation direction R1 by coming into abutment with the filter member 200 when the filter member 200 is pushed in the insertion direction (toward the other side L2) of the longitudinal direction L while keeping the second posture, and allows the filter member 200 to move toward the other side L2 (Y2) in the longitudinal direction L with the filter member 200 sliding thereon. Thus, it is possible to hold the filter member 200 pushed in the insertion direction (toward the other side L2), at a side (or the other side L2) of the developing device body 501 distal in the insertion direction of the longitudinal direction L.

Second Restriction Element

The second restriction element 522 is provided with a third restriction surface 522*a* and a fourth restriction surface 522*b*. The third restriction surface 522*a* and the fourth restriction surface 522*b* restrict the rotation of the filter member 200 in a second rotation direction R2 as a rotation direction toward the second posture from the first posture, so as to maintain the second posture after the filter member 200 is shifted from the first posture to the second posture.

In this example, the second restriction element 522 is provided at a top area of the first wall 501*c*. The third restriction surface 522*a* extends orthogonally to the up-down direction Z. The third restriction surface 522*a* restricts the rotation of the filter member 200 in the second rotation direction R2 by coming into abutment with the filter member 200 when the filter member 200 is pushed in the insertion direction (toward the other side L2) of the longitudinal direction L while keeping the second posture. The fourth restriction surface 522*b* extends orthogonally to the left-right direction X. The fourth restriction surface 522*b* allows, when the filter member 200 is pushed in the insertion direction (toward the other side L2) of the longitudinal direction L while keeping the second posture, the filter member 200 to move toward the other side L2 (Y2) in the longitudinal direction L with the filter member 200 sliding thereon. Thus, it is possible to hold the filter member 200 pushed in the insertion direction (toward the other side L2), at a side (or the other side L2) of the developing device body 501 distal in the insertion direction of the longitudinal direction L.

Third Restriction Element

The third restriction element 523 is provided with a fifth restriction surface 523*a*. The fifth restriction surface 523*a* restricts the movement of the filter member 200 (or the retainer 220) in the second posture toward the other side L2 (or the rear side Y2) in the longitudinal direction L.

In this example, the third restriction element 523 is configured by the first wall 501*c*, and thus the first wall 501*c* also serves as the third restriction element 523. The fifth restriction surface 523*a* extends orthogonally to the longitudinal direction L. Thus, the fifth restriction surface 523*a* can effectively prevent the filter member 200 shifted to the second posture from moving toward the other side L2 (rear side Y2) in the longitudinal direction L.

Positional Relationship in First to Fifth Restriction Surfaces

As depicted in FIG. 10C, dimension d1 of the third restriction surface 522*a* and of the fourth restriction surface 522*b* in the longitudinal direction L is larger than dimension d2 of the second restriction surface 521*b* in the longitudinal direction L, the dimension d2 corresponding to a distance between the fifth restriction surface 523*a* and the first restriction surface 521*a*. Specifically, the dimension d1 is set larger than the dimension d2 so that, when the filter member 200 in the first posture is inserted and the fourth edge frame 220*a*4 is abutted with the first restriction surface 521*a*, the movement of the filter member 200 in the first posture toward the other side L2 (rear side Y2) is restricted and, in this state, when the filter member 200 rotates in the second rotation direction R2 from the first posture to the second posture, the fourth edge frame 220*a*4 is capable of being abutted with the fourth restriction surface 522*b*.

Fourth Restriction Element

The fourth restriction element 524 is provided with a sixth restriction surface 524*a* and a seventh restriction surface 524*b*. The sixth restriction surface 524*a* and the seventh restriction surface 524*b* restrict the rotation of the filter member 200 in the second rotation direction R2 so as to maintain the second posture when the filter member 200 is shifted from the first posture to the second posture.

In this example, the fourth restriction element 524 is provided at a top area of a second wall 501*e* of the developing device body 501 located at one side L1 (or front side Y1) in the longitudinal direction L. The sixth restriction surface 524*a* extends orthogonally to the up-down direction Z. The sixth restriction surface 524*a* restricts the rotation of the filter member 200 in the second rotation direction R2 by coming into abutment with the filter member 200 when the filter member 200 is pushed in the insertion direction (toward the other side L2) of the longitudinal direction L while keeping the second posture. The seventh restriction surface 524*b* extends orthogonally to the left-right direction X. The seventh restriction surface 524*b* allows, when the filter member 200 is pushed in the insertion direction (toward the other side L2) of the longitudinal direction L while keeping the second posture, the filter member 200 to move toward the other side L2 (Y2) in the longitudinal direction L with the filter member 200 sliding thereon. Thus, it is possible to hold the filter member 200 pushed in the insertion direction (toward the other side L2), at a side (or one side L1) of the developing device body 501 opposite to the other side in the insertion direction of the longitudinal direction L.

Fifth Restriction Element

The fifth restriction element 525 is provided with an eighth restriction surface 525*a*. The eighth restriction surface 525*a* restricts the movement of the filter member 200 (or the retainer 220) in the second posture toward the one side L1 (or the front side Y1) in the longitudinal direction L.

In this example, the fifth restriction element 525 is configured by the second wall 501*e*, and thus the second wall 501*e* also serves as the fifth restriction element 525. The eighth restriction surface 525*a* extends orthogonally to the longitudinal direction L. Thus, the eighth restriction surface 525*a* can effectively prevent the filter member 200 shifted to the second posture from moving toward the one side L1 (front side Y1) in the longitudinal direction L.

Sixth Restriction Element

The developing device body 501 is further provided with a sixth restriction element 526 (see FIGS. 9A, 9B, 10B, 10C, 10F, 11A, 11C to 11E, and 11G to 12B).

The sixth restriction element 526 provided with a ninth restriction surface 526*a*. The ninth restriction surface 526*a* restricts the movement of the filter member 200 in the first posture in the first rotation direction R1 of the rotation direction R.

In this example, the sixth restriction element 526 is provided vertically on a downstream end of the guide 510 in the first rotation direction R1. The ninth restriction surface 526*a* extends orthogonally to the left-right direction X. Thus, the ninth restriction surface 526*a* can effectively prevent the filter member 200 shifted to the first posture from rotating in the first rotation direction R1.

Fifth Embodiment

Figure 13:
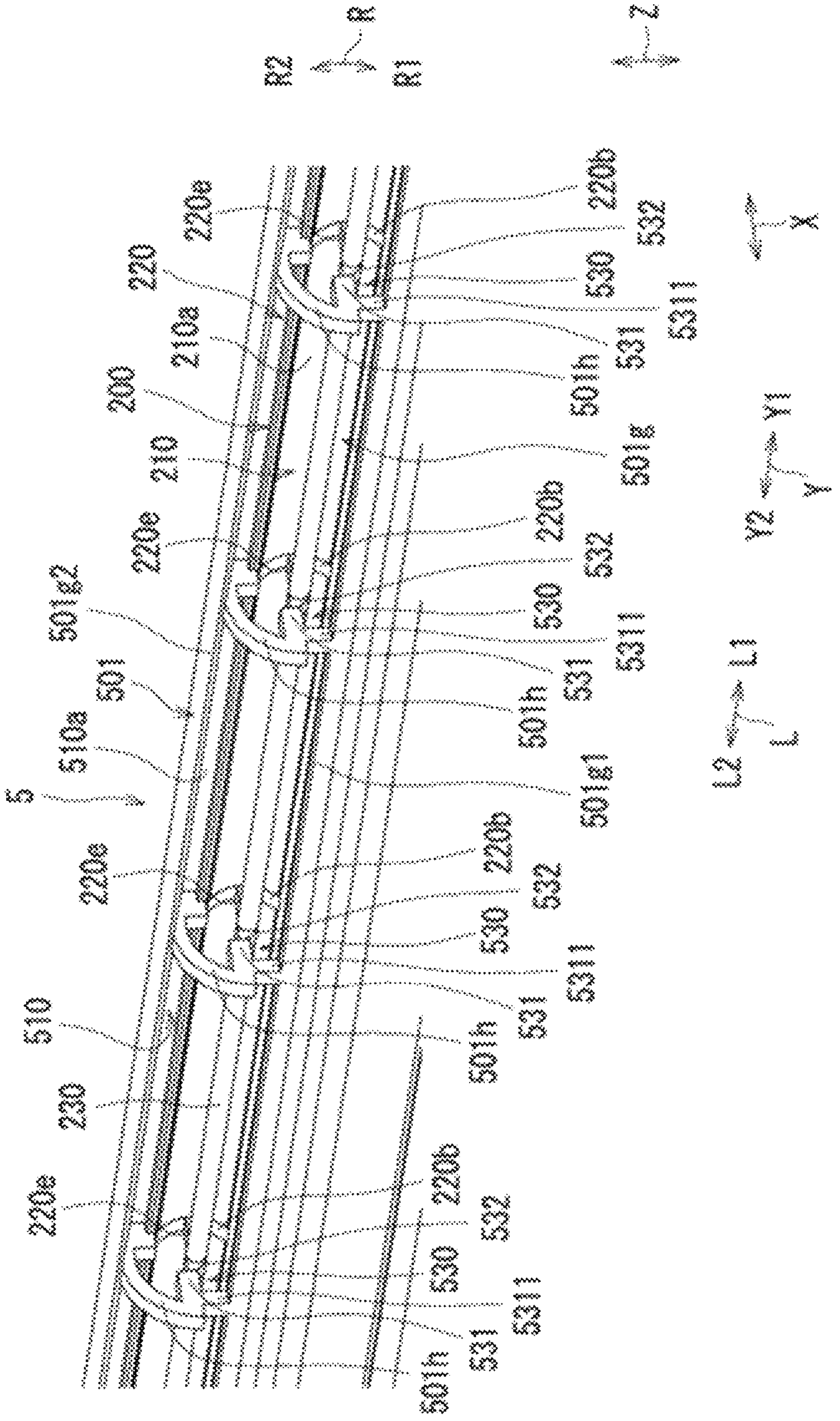
FIG. 13 is a perspective view depicting a portion of a developing device body, including a pressing mechanism formed thereon, as viewed obliquely from above on a side opposite to a vent-opening side.
Figure 14A:
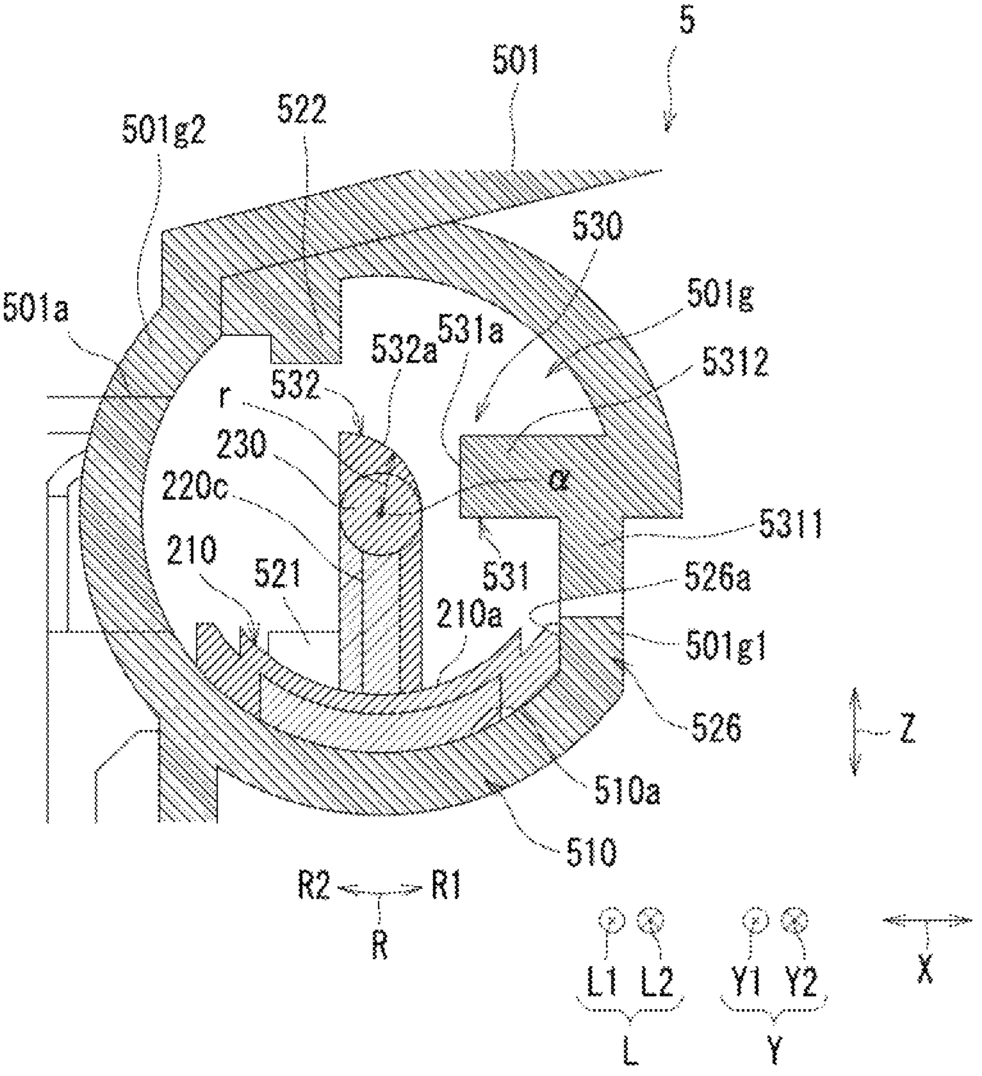
FIG. 14A is a sectional view depicting a pressing mechanism in a state where a filter member is in a first posture.
Figure 14B:
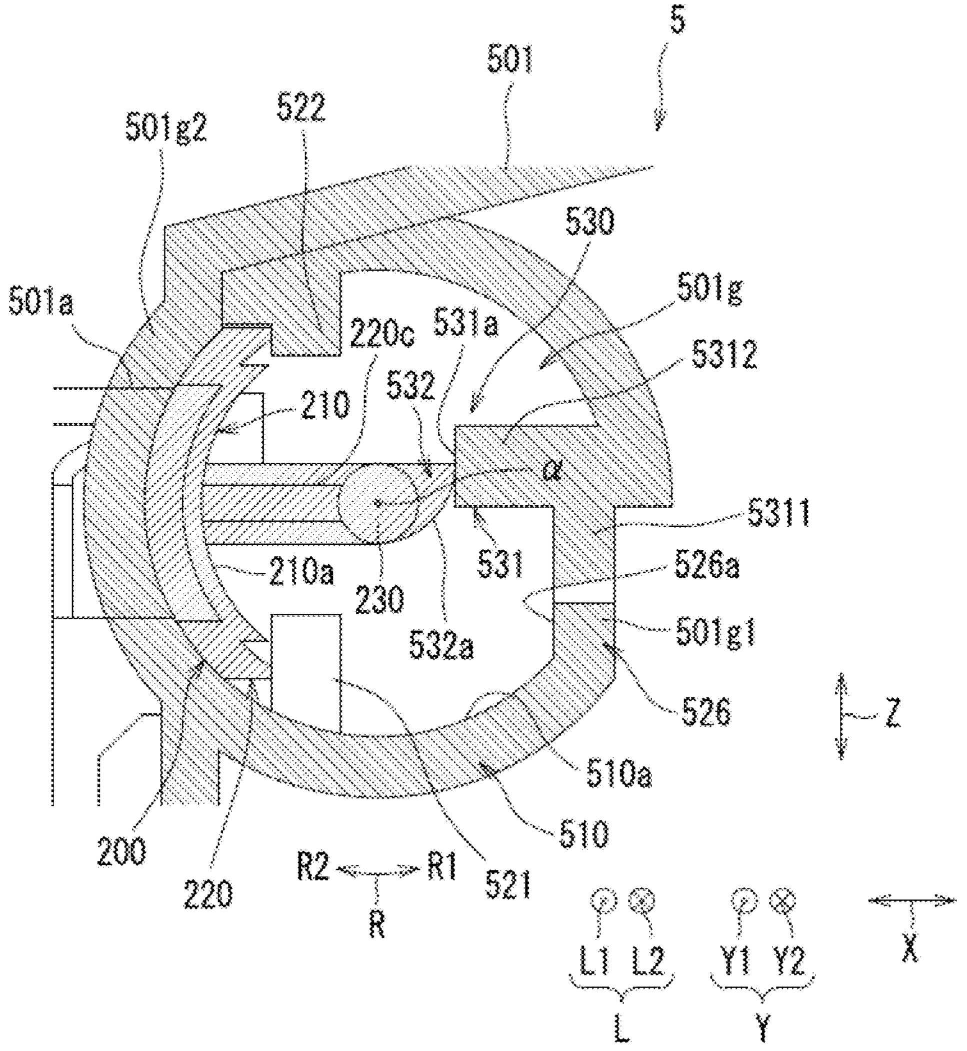
FIG. 14B is a sectional view depicting a pressing mechanism in a state where a filter member is in a second posture.
Figure 15A:
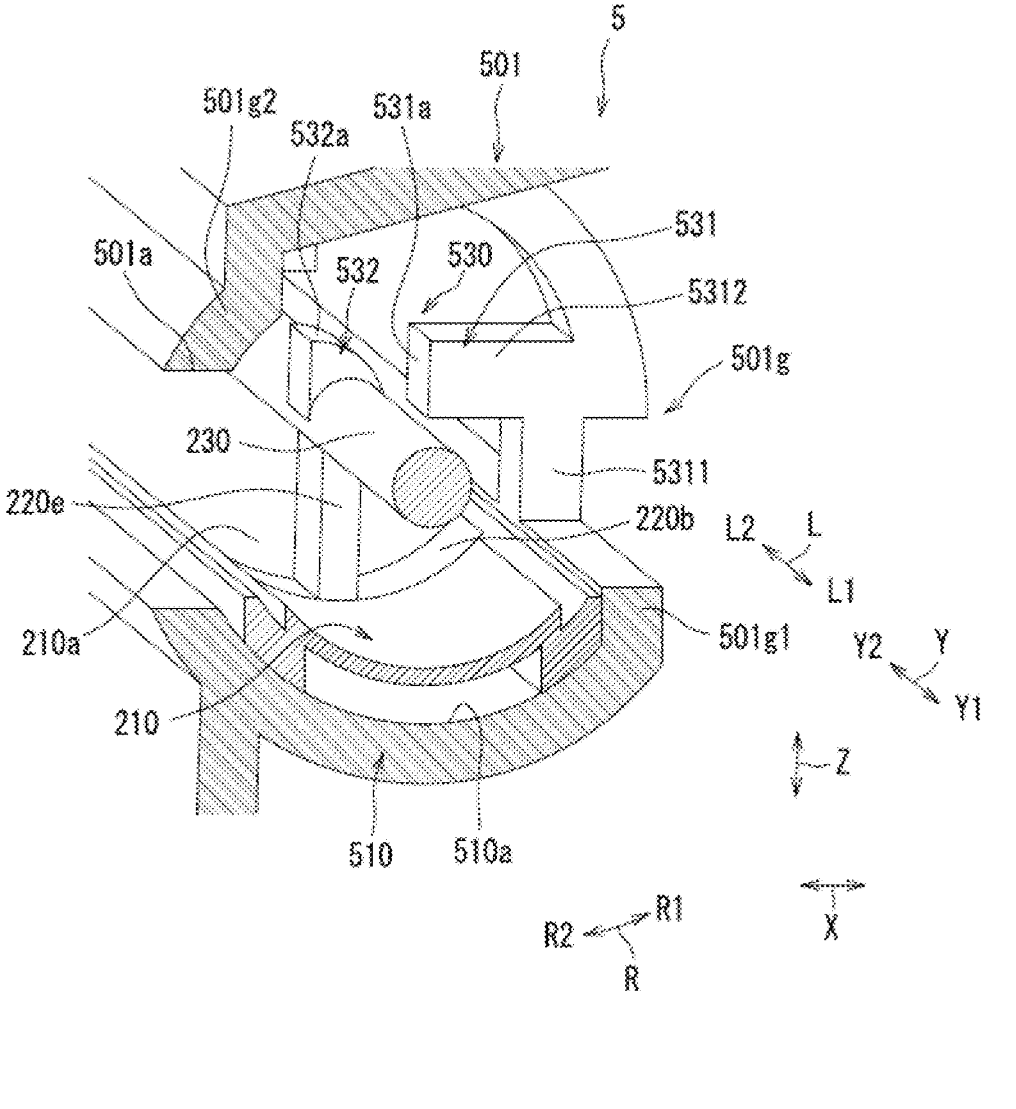
FIG. 15A is a perspective view depicting a pressing mechanism in a state where a filter member is in a first posture.
Figure 15B:
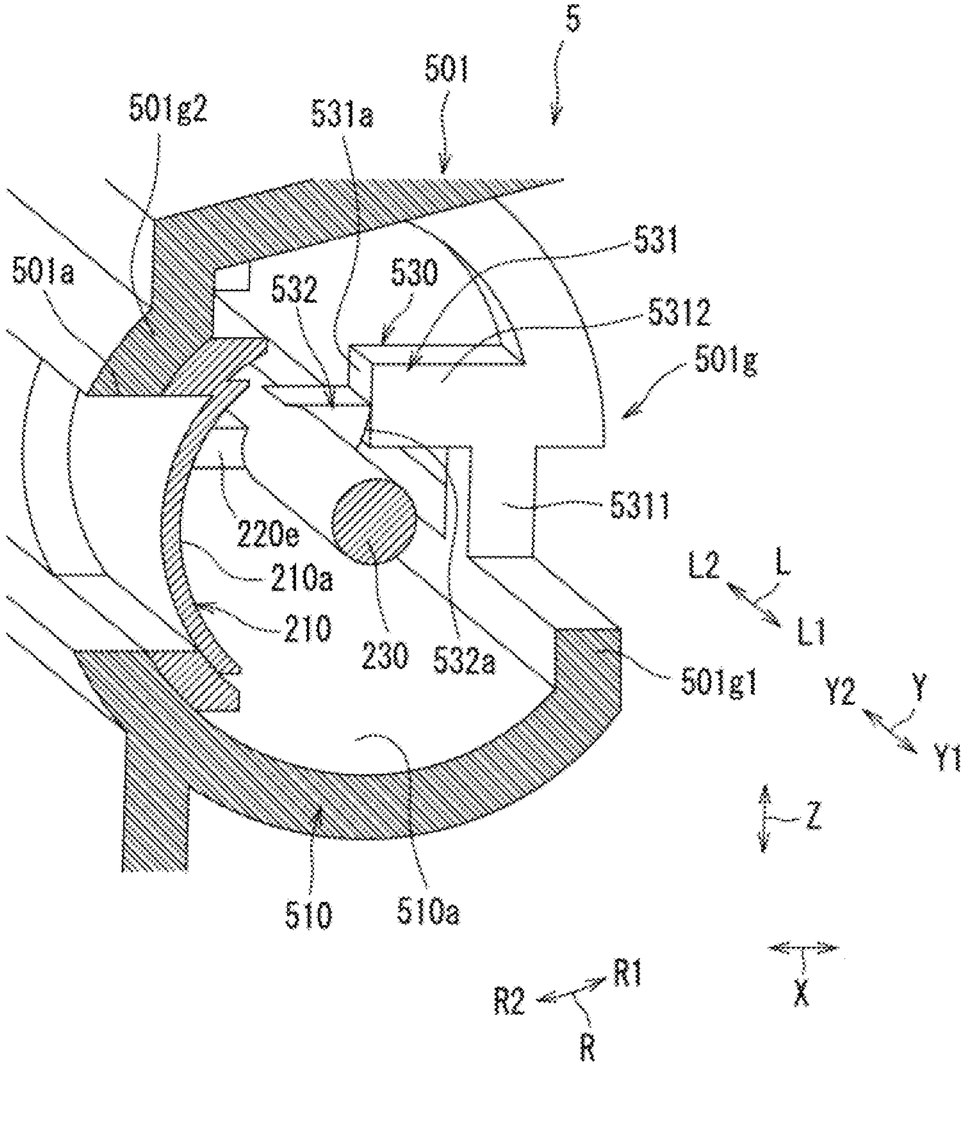
FIG. 15B is a perspective view depicting a pressing mechanism in a state where a filter member is in a second posture.

FIG. 13 is a perspective view depicting a portion of the developing device body 501, including a pressing mechanism 530 formed thereon, as viewed obliquely from above on the side opposite to the vent-opening (501*a*) side. FIG. 14A and FIG. 14B are sectional views depicting the pressing mechanism 530 in a state where the filter member 200 is in the first posture and in the second posture, respectively. FIG. 15A and FIG. 15B are perspective views depicting the pressing mechanism 530 in a state where the filter member 200 is in the first posture and in the second posture, respectively.

In the present embodiment, the developing device 5 further includes a pressing mechanism 530. The pressing mechanism 530 presses the filter member 200 toward a frame 501*f* surrounding the vent opening 501*a* by an operation that the filter member 200 is inserted in the longitudinal direction L relative to the developing device body 501 while keeping the first posture and is rotated about the rotation axis a after insertion (see FIGS. 9B, 10C, 10F, 10G, and 11G).

In this configuration, the pressing mechanism 530 presses the filter member 200 onto the frame 501*f* surrounding the vent opening 501*a* by rotating the filter member 200 about the rotation axis a after the insertion thereof, and thereby it is possible to improve sealing property between the filter member 200 and the frame 501*f* surrounding the vent opening 501*a*.

Sixth Embodiment

In the present embodiment, the pressing mechanism 530 includes a pressing element 531 and a pressed element 532. The pressing element 531 is provided in the developing device body 501. The pressed element 532 is provided in the filter member 200, and is formed so as to be pressed by the pressing element 531 in accordance with the rotation of the filter member 200 and thereby to push the filter member 200 toward the frame 501*f* surrounding the vent opening 501*a*.

In this configuration, it is possible to reliably improve sealing property between the filter member 200 and the frame 501*f* surrounding the vent opening 501*a* merely by a simple configuration of using the pressing element 531 and the pressed element 532.

Specifically, the developing device body 501 is provided with an open area 501*g* opening at a side opposite to the guide surface 510*a* of the guide 510, and the open area 501*g* communicates with the developer tank 51. The pressing element 531 and the pressed element 532 are configured such that a pressing force of the filter member 200 against the frame 501*f* increases as the filter member 200 in the first posture approaches the second posture by the rotation thereof in the second rotation direction R2.

In this example, the pressing element 531 and the pressed element 532 constitute a cam mechanism. The pressing element 531 is provided in the developing device body 501 at a position corresponding to each of the reinforcing supports 220*e* to 220*e*. A plurality of pressing elements 531 to 531 are located on a side opposite to the vent opening 501*a* with the rotation axis a interposed therebetween. Each of the pressing elements 531 to 531 is provided with an abutted surface 531*a* capable of abutting against the pressed element 532. The pressing element 531 is provided to extend toward the rotating shaft 230 at one end edge 501*g*1 of the open area 501*g* as seen in the rotation direction R (in this example, corresponding to the sixth restriction element 526) in the developing device body 501. Specifically, each of the pressing elements 531 to 531 is formed in an L-shape in a sectional view. Each of the pressing elements 531 to 531 is provided with a proximal end part 5311 protruding from the end edge 501*g*1 of the open area 501*g* such that a distal end part 5312 faces the rotating shaft 230, and a top surface of the distal end part 5312 serves as the abutted surface 531*a*.

As depicted in FIG. 13, the pressed element 532 is provided on the rotating shaft 230 at a location corresponding to each of the reinforcing supports 220*e* to 220*e*. A plurality of pressed elements 532 to 532 are located on a side opposite to the filter 210 with the rotation axis a interposed therebetween. Each of the pressed elements 532 to 532 is provided with an abutting surface 532*a* (see FIGS. 14A and 14B) capable of coming into abutment with the pressing element 531. The abutting surface 532*a* is formed such that a distance r (see FIG. 14A) from the rotation axis a increases as the abutting surface 532*a* getting away from the abutted surface 531*a* of the pressing element 531 when the filter member 200 is in the first posture. Thus, it is possible to gradually increase the pressing force of the filter member 200 against the frame 501*f* as the filter member 200 being shifted from the first posture to the second posture. Specifically, the distal end of each of the pressed elements 532 to 532 is formed in an arc shape (in this example, approximately ¼ arc shape) centered on a point different from the rotation axis a.

In the present embodiment, a plurality of pressing mechanisms 530 are provided. Thus, provision of the plurality of pressing mechanisms 530 makes it possible to further improve the sealing property between the filter member 200 in the second posture and the frame 501*f* surrounding the vent opening 501*a*. In addition, provision of the pressing element 531 and the pressed element 532 in each of the pressing mechanisms 530 to 530 makes it possible to yet further improve the sealing property between the filter member 200 in the second posture and the frame 501*f* surrounding the vent opening 501*a*.

Note that the pressing element 531 and the pressed element 532 may be provided at locations corresponding to the supports 220*c* and 220*d*.

In addition, the filter 210 is formed of one sheet in this example, but may be formed of a plurality of sheets. In this case, a plurality of filters 210 can be provided respectively for partial vent openings that may be obtained by dividing the vent opening 501*a* by plural first reinforcing elements 220*b*. In other words, plural filters 210 can be provided respectively between the support 220*c* on one side and the first reinforcing element 220*b*, between the adjacent first reinforcing elements 220*b* and 220*b*, and between the first reinforcing element 220*b* and the support 220*d* on the other side.

As depicted in FIG. 13, the developing device body 501 is provided with one or more of (four, in this example) second reinforcing elements 501*h* to 501*h* for reinforcing the open area 501*g*. Thus, it is possible to improve strength of the open area 501*g* by the second reinforcing elements 501*h* to 501*h*.

Specifically, the second reinforcing elements 501*h* to 501*h* are formed across the open area 501*g* along the rotation direction R at locations corresponding to the reinforcing supports 220*e* to 220*e*. In this example, the second reinforcing elements 501*h* to 501*h* are joined between the reinforcing supports 220*e* to 220*e* and the proximal ends 5311 to 5311. Each of the second reinforcing elements 501*h* to 501*h* is formed in an arc shape (in this example, approximately ¼ arc shapes) centered on the rotation axis a.

Seventh Embodiment

In this embodiment, the developing device body 501 is provided with an insertion port 501*b*, into which the filter member 200 is inserted in the longitudinal direction L. The filter member 200 includes a blocking element 242 (in this example, a sealing element) that blocks (in this example, seals) the insertion port 501*b* by the attaching operation with respect to the developing device body 501 (see FIGS. 6A, 6B, 7B, 10A, 10D, 10E, 11A, and 11B). In this example, the insertion port 501*b* is configured as an insertable and removable port, through which the filter member 200 is inserted and removed in the longitudinal direction L. In this example, the filter member 200 is inserted into the insertion port 501*b* at the time of attachment, and is pulled out from the insertion port 501*b* at the time of detachment.

In this configuration, when the filter member 200 is inserted into the insertion port 501*b* of the developing device body 501, it is possible for the blocking element 242 to block the insertion port 501*b* by the attaching operation of the filter member 200 relative to the developing device body 501. Thus, it is not necessary to provide the blocking element 242 separately from the filter member 200 for ensuring an operation of blocking the insertion port 501*b* by the blocking element 242. Therefore, it is possible to block (in this example, seal) the insertion port 501*b* by a single operation of the attaching operation of the filter member 200 relative to the developing device body 501. Note that the dimension of the blocking element 242 is smaller than the dimension of the insertion port 501*b* by a predetermined size to the extent that the blocking element 242 can be inserted into the insertion port 501*b* while sliding therethrough. The blocking element 242 is formed on the rotating shaft 230 so as to match the shape of the insertion port 501*b* when the filter member 200 is in the second posture. The blocking element 242 blocks the insertion port 501*b* when the filter member 200 inserted into the developing device body 501 in the first posture and shifted to the second posture is pushed in the insertion direction (toward the other side L2) of the longitudinal direction L.

Specifically, the insertion port 501*b* is formed in a shape allowing the filter member 200 in the first posture being inserted therethrough, as well as corresponding (or similar) to the outer profile of the blocking element 242 of the filter member 200 in the second posture as viewed in the longitudinal direction L and allowing the blocking element 242 being inserted therethrough (i.e., predetermined size larger).

As depicted in FIGS. 7B, 10A, 10D, 11A, and 11B, the blocking element 242 includes a first blocking element 2421 and a second blocking element 2422. As depicted in FIGS. 9A and 10E, the insertion port 501*b* includes a first insertion port branch 501*b*1 and a second insertion port branch 501*b*2. The first insertion port branch 501*b*1 is configured so as to allow the filter 210 and the retainer 220 of the filter member 200 in the first posture being inserted therethrough and to be blocked by the first blocking element 2421 of the filter member 200 in the second posture. The second insertion port branch 501*b*2 is configured so as to allow the rotating shaft 230 and the retainer 220 of the filter member 200 in the first posture being inserted therethrough and to be blocked by the second blocking element 2422 of the filter member 200 in the second posture.

In this example, the first blocking element 2421 and the second blocking element 2422 are provided on a second surface 240*b* of the grip 240 (see FIGS. 7B and 10A) on the other side L2 (rear side Y2) in the longitudinal direction L. Thus, it is possible to reliably block and, furthermore, seal the insertion port 501*b* by the blocking element 242.

The first blocking element 2421 is connected (or fixed) to the retainer 220. Thus, it is possible to reliably block and, furthermore, seal the insertion port 501*b* by the blocking element 242. A predetermined gap "e" (FIG. 10A) larger than a thickness "h" (FIG. 10A) of the second wall 501*e* is provided between the retainer 220 and the grip 240. Thus, it is possible to avoid interference between the retainer 220 and the second wall 501*e* when the filter member 200 inserted into the developing device body 501 is shifted from the first posture to the second posture.

Note that, instead of or in addition to the blocking element 242, a sealing element such as a porous member (so-called sponge) may be used to seal the insertion port 501*b*.

Replacement Operation of Filter Member by User

In the developing device 5 described above, when the filter member 200 clogged with toner is required to be detached, first a user pulls out the filter member 200, attached to the developing device body 501 and being in the second posture, toward the one side L1 (or detaching side) in the longitudinal direction L along the guide surface 510*a* of the guide 510. Then, the filter member 200 comes into abutment with the eighth restriction surface 525*a* of the fifth restriction element 525 (i.e., second wall 501*e*). Next, the user rotates (in this example, rotates by 90 degrees) the filter member 200 (in this example, in the first rotation direction R1) along the guide surface 510*a* so as to shift the filter member 200 to the first posture. Then, the filter member 200 comes into abutment with the ninth restriction surface 526*a* of the sixth restriction element 526. At this time, the filter member 200 is in the first posture, and the filter 210 and the retainer 220 face the insertion port 501*b*. As a result, it is possible for the user to pull out (or detach) the filter member 200 from the insertion port 501*b* of the developing device body 501 with the inner surface 210*a* of the filter 210 being in the first posture and facing upward. Therefore, it is possible to prevent the toner adhering to the inner surface 210*a* of the filter 210 from falling when the filter member 200 is detached from the developing device body 501.

On the other hand, when a new filter member 200 is required to be attached, first a user puts the filter member 200 in the insertion port 501*b* of the developing device body 501 so as to fit the shape of the insertion port 501*b*. Then, the filter member 200 takes the first posture. Next, the user inserts the filter member 200 toward the other side L2 (or attaching side) in the longitudinal direction L along the guide surface 510*a* of the guide 510. Then, the retainer 220 of the filter member 200 comes into abutment with the first restriction surface 521*a* of the first restriction element 521, and/or the blocking element 242 of the filter member 200 comes into abutment with the insertion-side surface 5011 of the developing device body 501. Next, the user rotates (in this example, rotates by 90 degrees) the filter member 200 (in this example, in the second rotation direction R2) along the guide surface 510*a* so as to shift the filter member 200 to the second posture. Then, the filter member 200 comes into abutment with the third restriction surface 522*a* and the fourth restriction surface 522*b* of the second restriction element 522. At this time, the filter member 200 is in the second posture, and the movement of the filter member 200 toward the one side L1 (front side Y1) in the longitudinal direction L is restricted by the eighth restriction surface 525*a* of the fifth restriction element 525. In addition, the blocking element 242 faces the insertion port 501*b*. Next, the user pushes the filter member 200 toward the other side L2 in the longitudinal direction L (insertion direction) with the filter member 200 being in the second posture. Then, at the other side L2, the filter member 200 comes into abutment with the second restriction surface 521*b*. Therefore, the rotation in the first rotation direction R1 is restricted by the second restriction surface 521*b*. Further, at the other side L2, the rotation in the second rotation direction R2 is restricted by the third restriction surface 522*a* and the fourth restriction surface 522*b*, and at the one side L1, the rotation in the second rotation direction R2 is restricted by the sixth restriction surface 524*a* and the seventh restriction surface 524*b*. At this time, the insertion port 501*b* is blocked (sealed, in this example) by the blocking element 242 (sealing element, in this example). Accordingly, it is possible for the user to mount (or attach) the filter member 200 to the developing device body 501 with the filter member 200 being in the second posture.

Other Embodiments

In the first to seventh embodiments described above, each of the pair of supports 220*c* and 220*d* may support the third edge frame 220*a*3 and the fourth edge frame 220*a*4 of the opening 220*a* with plural reinforcing supports. In this configuration, it is possible to reliably support the third edge frame 220*a*3 and the fourth edge frame 220*a*4 of the opening 220*a* by the pair of supports 220*c* and 220*d*. In addition, each of the plurality of reinforcing supports 220*e* to 220*e* may support each of the first reinforcing elements 220*b* to 220*b* with plural reinforcing supports, instead of supporting each of the first reinforcing element 220*b* to 220*b* with a single reinforcing support. In this configuration, it is possible to reliably support the first reinforcing elements 220*b* to 220*b* by the plurality of reinforcing supports 220*e* to 220*e*.

Figure 16A:
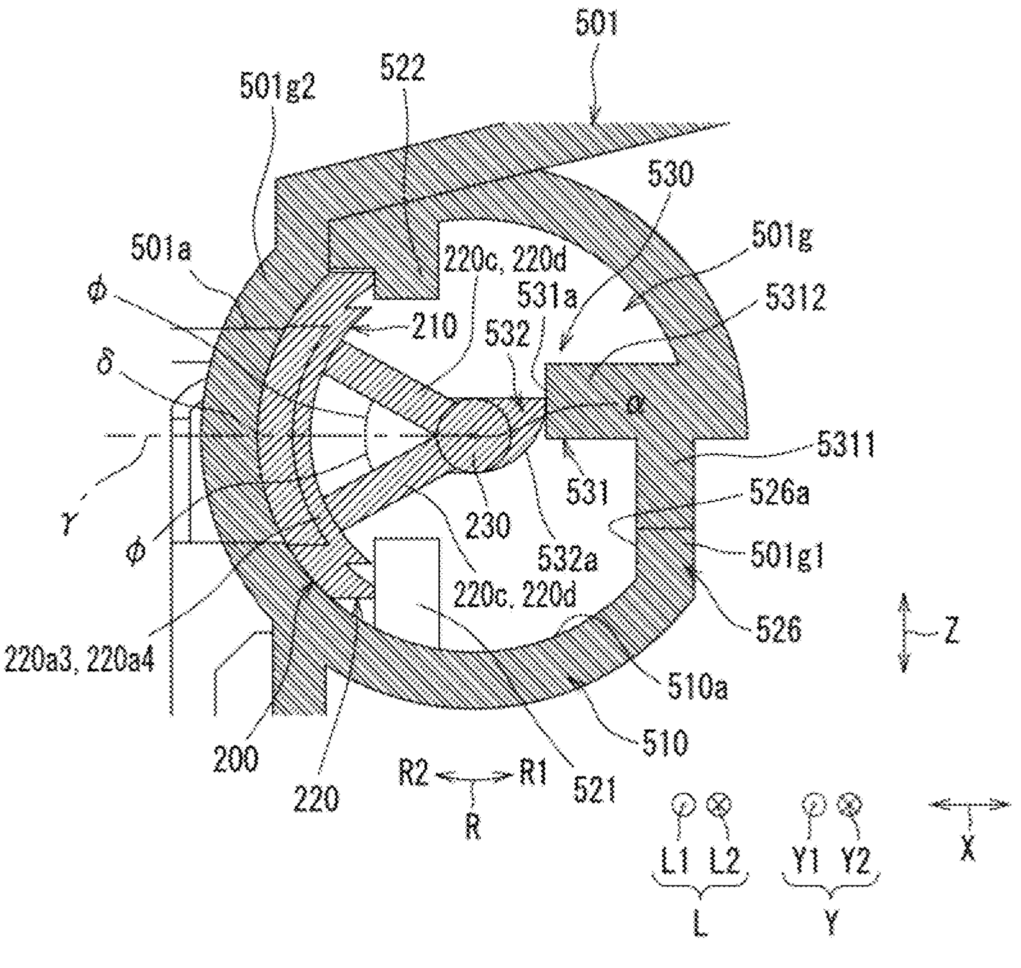
FIG. 16A is a sectional view depicting another example of a pair of supports that support a third edge frame and a fourth edge frame of an opening.
Figure 16B:
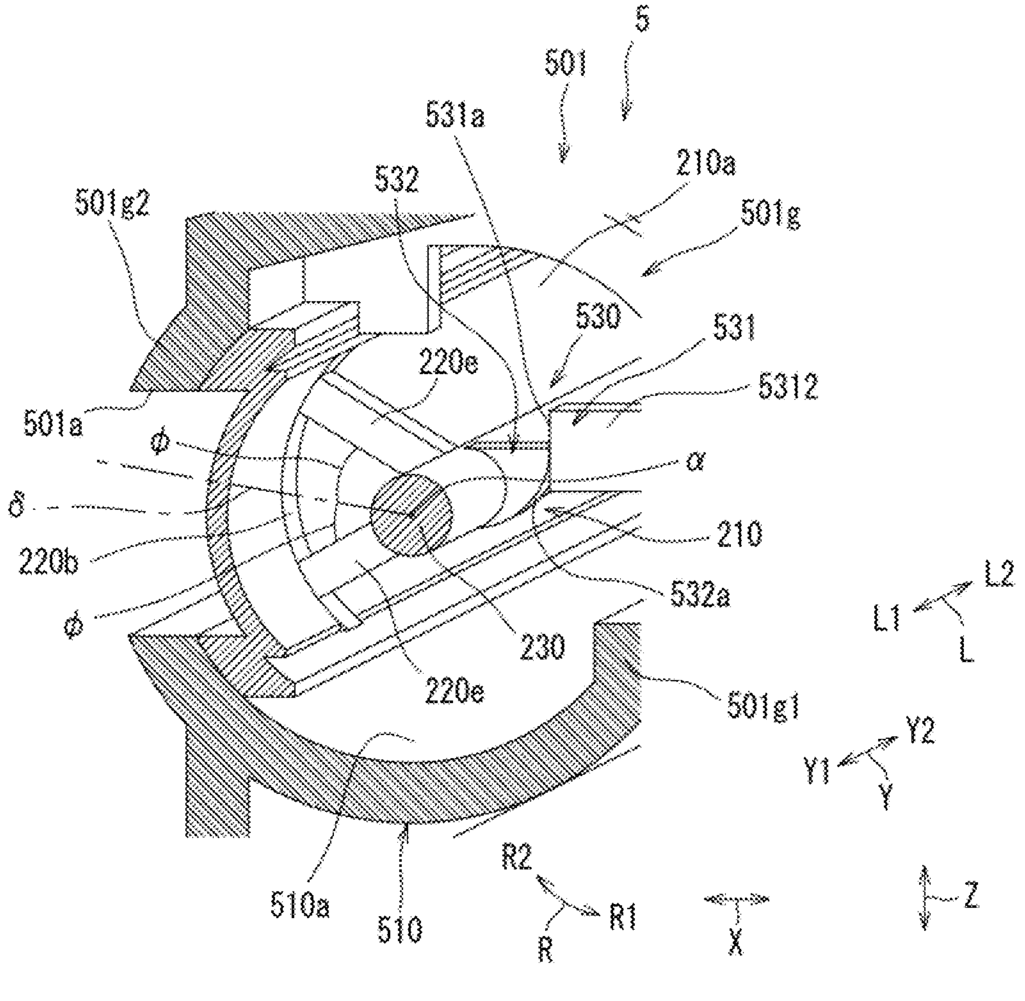
FIG. 16B is a perspective view depicting another example of a first reinforcing element that supports a reinforcing support.

FIG. 16A is a sectional view depicting another example of the pair of supports 220*c* and 220*d* that support the third edge frame 220*a*3 and the fourth edge frame 220*a*4 of the opening 220*a*. Note that FIG. 16A illustrates the pair of supports 220*c* and 220*d* in a single figure. FIG. 16B is a perspective view depicting another example of the first reinforcing elements 220*b* to 220*b* that support the reinforcing supports 220*e* to 220*e*. Further, FIG. 17 is a perspective view depicting a portion of the developing device body 501, including the insertion port 501*b* formed thereon, before the filter member 200 depicted in FIGS. 16A and 16B is inserted into the developing device body 501 in the first posture, as viewed obliquely from above on the front side Y1 and on the vent-opening (501*a*) side.

Figure 17:
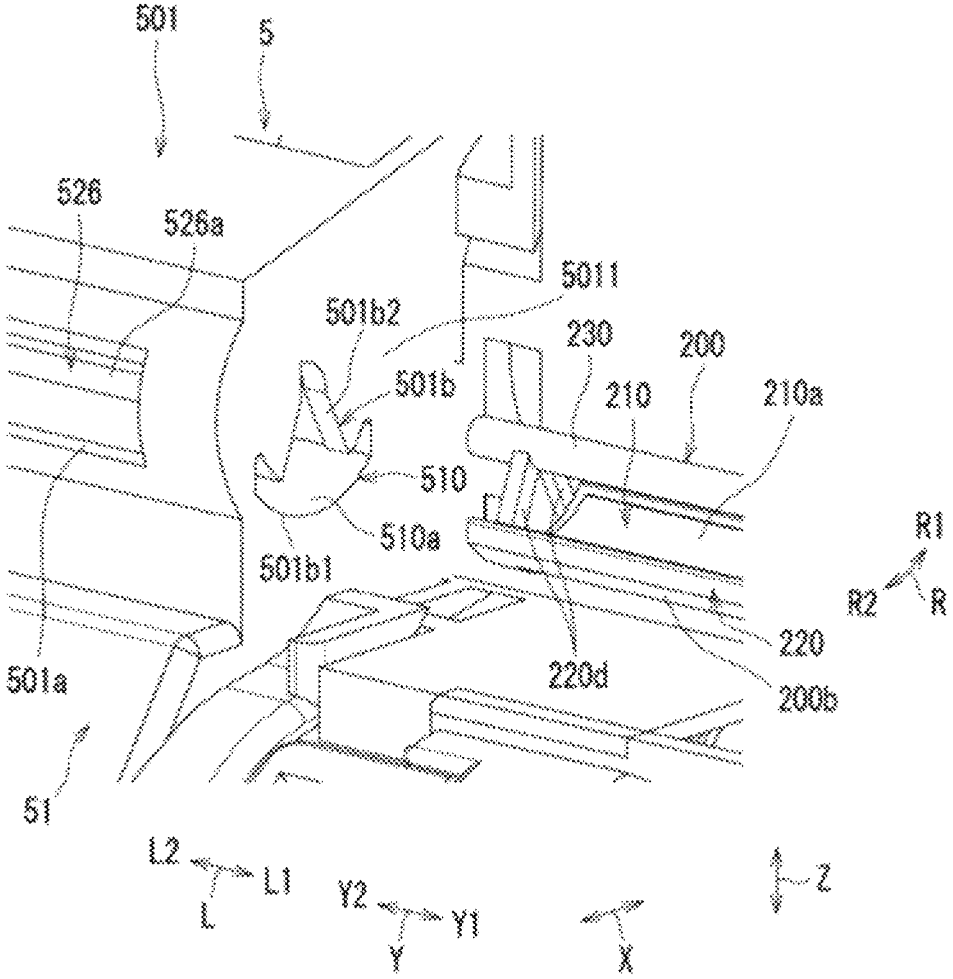
FIG. 17 is a perspective view depicting a portion of a developing device body, including an insertion port formed thereon, before a filter member depicted in FIGS. 16A and 16B is inserted into the developing device body in a first posture, as viewed obliquely from above on a front side and on a vent-opening side.

In FIGS. 16A to 17, the components identical to those in the first to seventh embodiments are denoted by the identical reference signs, and the description thereof will not be repeated.

The end points, of the pair of supports 220*c* and 220*d* and the plurality of reinforcing supports 220*e* to 220*e*, opposite to the rotating shaft 230 are provided respectively at locations line-symmetric with respect to a virtual straight line γ passing through the rotation axis a and the center δ of the third edge frame 220*a*3, the fourth edge frame 220*a*4 and the plurality of first reinforcing elements 220*b* to 220*b* in the rotation direction R. In other words, the angles q between the virtual straight line γ and the supports (220*c*, 220*c*), (220*d*, 220*d*) and reinforcing supports 220*e* to 220*e* symmetrical with respect to the virtual straight line γ, are equal to each other.

In this example, each of the supports 220*c* and 220*d* supports the third edge frame 220*a*3 and the fourth edge frame 220*a*4 of the opening 220*a* with two supports, and each of the first reinforcing elements 220*b* to 220*b* supports the reinforcing supports 220*e* to 220*e* with two reinforcing supports.

In the first to seventh embodiments, the filter member 200 may be configured so that the filter 210 is provided outside the retainer 220, instead of being provided inside the retainer 220. In this configuration, the filter 210 is interposed between the retainer 220 of the filter member 200 in the second posture and the frame 501*f* surrounding the vent opening 501*a*, and thereby it is possible to further improve sealing contact between the retainer 220 of the filter member 200 and the frame 501*f* surrounding the vent opening 501*a*. The above configuration is particularly effective if the filter 210 has elasticity, since the elasticity in thickness of the filter 210 can be utilized.

The present disclosure is not limited to the embodiments described above, and can be implemented in various other forms. Therefore, the described embodiments are merely examples in any respects, and should not be interpreted in a limited manner. The scope of the present disclosure is defined by the appended claims, and is not restricted by the description of the specification. Furthermore, all modifications or changes belonging to the equivalent scope of the claims are within the scope of the present disclosure.

What is claimed is:

1. A developing device comprising:
a developing device body including a vent opening that releases internal pressure; and
a filter member including a filter that closes the vent opening, the filter member detachably attached to the developing device body,
wherein the filter member is subjected to an attaching operation and a detaching operation, relative to the developing device body, in a state where an inner surface of the filter is in a predetermined first posture with the inner surface facing upward, and
wherein the filter member is held on the developing device body in a state where the inner surface of the filter is in a predetermined second posture different from the first posture.

2. The developing device of claim 1,
wherein the developing device body and the vent opening extend in a predetermined longitudinal direction, and
wherein the filter member is provided so as to be insertable into and removable from the developing device body along the predetermined longitudinal direction in a condition in which the developing device is mounted on an image forming apparatus body.

3. The developing device of claim 2,
wherein the filter member includes a retainer that retains the filter so as to make the filter into an arc shape, and a rotating shaft located facing the inner surface of the filter, the rotating shaft supporting the retainer so as to be rotatable with a center of the arc shape as a rotation axis.

4. The developing device of claim 3,
wherein the filter member is rotatable about the rotation axis between the first posture and the second posture in a state where the filter member is inserted into the developing device body.

5. The developing device of claim 3,
further comprising a pressing mechanism that presses the filter member toward a frame surrounding the vent opening when the filter member is inserted in the predetermined longitudinal direction relative to the developing device body, while keeping the first posture, and when the filter member is rotated about the rotation axis after insertion.

6. The developing device of claim 5,
wherein the pressing mechanism includes a pressing element provided in the developing device body and a pressed element provided in the filter member, the pressed element formed to be pressed by the pressing element in accordance with a rotation of the filter member and thereby to push the filter member against the frame surrounding the vent opening.

7. The developing device of claim 2, wherein the filter member is held on the developing device body when the filter member is pushed in an insertion direction of the predetermined longitudinal direction while keeping the second posture.

8. The developing device of claim 1, wherein the developing device body is provided with an insertion port, into which the filter member is inserted in a longitudinal direction, and wherein the filter member includes a sealing element that seals the insertion port by the attaching operation relative to the developing device body.

9. An image forming apparatus comprising the developing device of claim 1.

* * * * *